United States Patent
Barber et al.

(10) Patent No.: US 12,066,548 B2
(45) Date of Patent: Aug. 20, 2024

(54) LIDAR TRANSMIT/RECEIVE SYSTEM

(71) Applicant: Aurora Operations, Inc., Pittsburgh, PA (US)

(72) Inventors: Zeb Barber, Bozeman, MT (US); Stephen Crouch, Bozeman, MT (US); Emil Kadlec, Bozeman, MT (US)

(73) Assignee: Aurora Operations, Inc., Pittsburgh, PA (US)

( * ) Notice: Subject to any disclaimer, the term of this patent is extended or adjusted under 35 U.S.C. 154(b) by 184 days.

(21) Appl. No.: 17/674,537

(22) Filed: Feb. 17, 2022

(65) Prior Publication Data

US 2022/0171072 A1 Jun. 2, 2022

Related U.S. Application Data

(63) Continuation of application No. 17/228,346, filed on Apr. 12, 2021, now Pat. No. 11,280,909, which is a
(Continued)

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4814* (2013.01); *G01S 7/4912* (2013.01); *G01S 17/34* (2020.01);
(Continued)

(58) Field of Classification Search
None
See application file for complete search history.

(56) References Cited

U.S. PATENT DOCUMENTS 4,850,041 A * 7/1989 Roberts ............... G01S 7/4812
356/28
6,559,932 B1 5/2003 Halmos
(Continued)

FOREIGN PATENT DOCUMENTS

CN 105026970 11/2015
CN 110907918 A 3/2020
(Continued)

OTHER PUBLICATIONS

Martin, Aude, et al. "Photonic integrated circuit-based FMCW coherent LiDAR." Journal of Lightwave Technology 36.19 (2018): 4640-4645. (Year: 2018).*
(Continued)

*Primary Examiner* — Luke D Ratcliffe
(74) *Attorney, Agent, or Firm* — Dority & Manning, P.A.

(57) ABSTRACT

A light detection and ranging (LIDAR) system for a vehicle, includes a laser source configured to generate light signals, a transceiver, and a fiber array coupled to the transceiver and including a plurality of output channels. The transceiver is configured to receive one or more light signals from the laser source through a first group of output channels of the fiber array, receive one or more local oscillator (LO) signals through a second group of output channels of the fiber array, transmit the one or more light signals into an environment of the vehicle, receive a first returned light reflected from one or more objects in the environment, and output the first returned light and a first LO signal of the one or more LO signals.

23 Claims, 13 Drawing Sheets

Related U.S. Application Data continuation-in-part of application No. 17/196,002, filed on Mar. 9, 2021, now Pat. No. 11,892,543, which is a continuation of application No. 16/915,404, filed on Jun. 29, 2020, now Pat. No. 10,948,600.

(51) Int. Cl.
  *G01S 7/4912* (2020.01)
  *G01S 17/34* (2020.01)
  *G05D 1/00* (2024.01)

(52) U.S. Cl.
  CPC ......... *G05D 1/0088* (2013.01); *G05D 1/0223* (2013.01)

(56) References Cited

U.S. PATENT DOCUMENTS

| | | |
|---|---|---|
| 7,440,102 B1 | 10/2008 | Videen |
| 8,988,754 B2 | 3/2015 | Sun et al. |
| 9,316,534 B1 | 4/2016 | Kondratko et al. |
| 9,476,981 B2 | 10/2016 | Yaacobi et al. |
| 10,222,474 B1* | 3/2019 | Raring .................. H01S 5/4087 |
| 10,338,321 B2 | 7/2019 | Hosseini et al. |
| 10,627,517 B2 | 4/2020 | Yaacobi et al. |
| 10,754,091 B1 | 8/2020 | Nagarajan |
| 10,761,272 B2 | 9/2020 | Hosseini et al. |
| 10,948,600 B1 | 3/2021 | Barber et al. |
| 11,150,411 B2 | 10/2021 | Hosseini et al. |
| 11,372,106 B2 | 6/2022 | Yaacobi et al. |
| 2017/0299697 A1 | 10/2017 | Swanson |
| 2018/0267250 A1 | 9/2018 | Hosseini et al. |
| 2019/0154810 A1 | 5/2019 | Tanemura et al. |
| 2019/0154832 A1 | 5/2019 | Maleki et al. |
| 2019/0310368 A1 | 10/2019 | Lachapelle |
| 2019/0339389 A1 | 11/2019 | Russo et al. |
| 2019/0391243 A1* | 12/2019 | Nicolaescu ........... G01S 7/4863 |
| 2020/0088876 A1 | 3/2020 | Tanemura et al. |
| 2020/0150251 A1 | 5/2020 | Crouch et al. |
| 2020/0158834 A1 | 5/2020 | Han et al. |
| 2020/0166617 A1 | 5/2020 | Crouch et al. |
| 2020/0174124 A1 | 6/2020 | Raring et al. |
| 2020/0200881 A1 | 6/2020 | Maier et al. |
| 2020/0292745 A1 | 9/2020 | Waldern et al. |
| 2021/0055391 A1 | 2/2021 | LaChapelle et al. |
| 2021/0055694 A1 | 2/2021 | Chan et al. |
| 2021/0141058 A1 | 5/2021 | Piggott et al. |
| 2021/0181309 A1 | 6/2021 | Oza et al. |
| 2021/0181320 A1 | 6/2021 | Oza et al. |
| 2021/0405203 A1 | 12/2021 | Barber et al. |
| 2022/0003937 A1 | 1/2022 | Hosseini et al. |

FOREIGN PATENT DOCUMENTS

| | | |
|---|---|---|
| EP | 2929382 | 5/2018 |
| JP | 2010127918 A | 6/2010 |
| JP | 2020503530 A | 1/2017 |
| JP | 6363619 | 7/2018 |
| JP | 2020510882 A | 4/2020 |
| KR | 102181537 | 11/2020 |
| KR | 102350191 | 1/2022 |
| WO | WO 2015044370 A1 | 4/2015 |
| WO | WO-2018/107237 A1 | 6/2018 |

OTHER PUBLICATIONS

Martin et al, "Photonic Integrated Circuit-Based FMCW Coherent LiDAR", Journal of Lightwave Technology, vol. 36, No. 19, 2018, 6 pages.
Extended European Search Report for Application No. 21834509.8, mailed Aug. 2, 2023, 9 pages.
International Preliminary Report on Patentability, PCT Application PCT/US2021/035683, mailed Sep. 17, 2021, 6 pages.
U.S. Appl. No. 17/228,339, filed Apr. 12, 2021, 70 pages.
U.S. Appl. No. 17/531,029, filed Nov. 19, 2021, 45 pages.
U.S. Appl. No. 17/542,459, filed Dec. 5, 2021, 46 pages.
U.S. Appl. No. 17/558,476, filed Dec. 21, 2021, 61 pages.
U.S. Appl. No. 17/196,002, filed Mar. 9, 2021, 48 pages.
U.S. Appl. No. 17/750,247, filed May 20, 2022, 64 pages.
U.S. Appl. No. 18/160,817, filed Jan. 27, 2023, 70 pages.
U.S. Appl. No. 18/161,441, filed Jan. 30, 2023, 70 pages.
U.S. Appl. No. 18/160,836, filed Jan. 27, 2023, 47 pages.
International Search Report and Written Opinion on Appl. Ser. No. PCT/US2021/035683 dated Sep. 17, 2021 (8 pages).
Non-Final Office Action on U.S. Appl. No. 17/228,339 dated Nov. 23, 2021 (13 pages).
Notice of Allowance on U.S. Appl. No. 16/915,404 dated Nov. 12, 2020 (5 pages).
Office Action on U.S. Appl. No. 16/915,404 dated Aug. 25, 2020 (5 pages).
Office Action on U.S. Appl. No. 17/228,339 dated Jul. 27, 2021 (12 pages).
Office Action on U.S. Appl. No. 17/228,346 dated Jul. 13, 2021 (11 pages).
U.S. Notice of Allowance on U.S. Appl. No. 17/228,346 dated Nov. 18, 2021 (6 pages).

\* cited by examiner

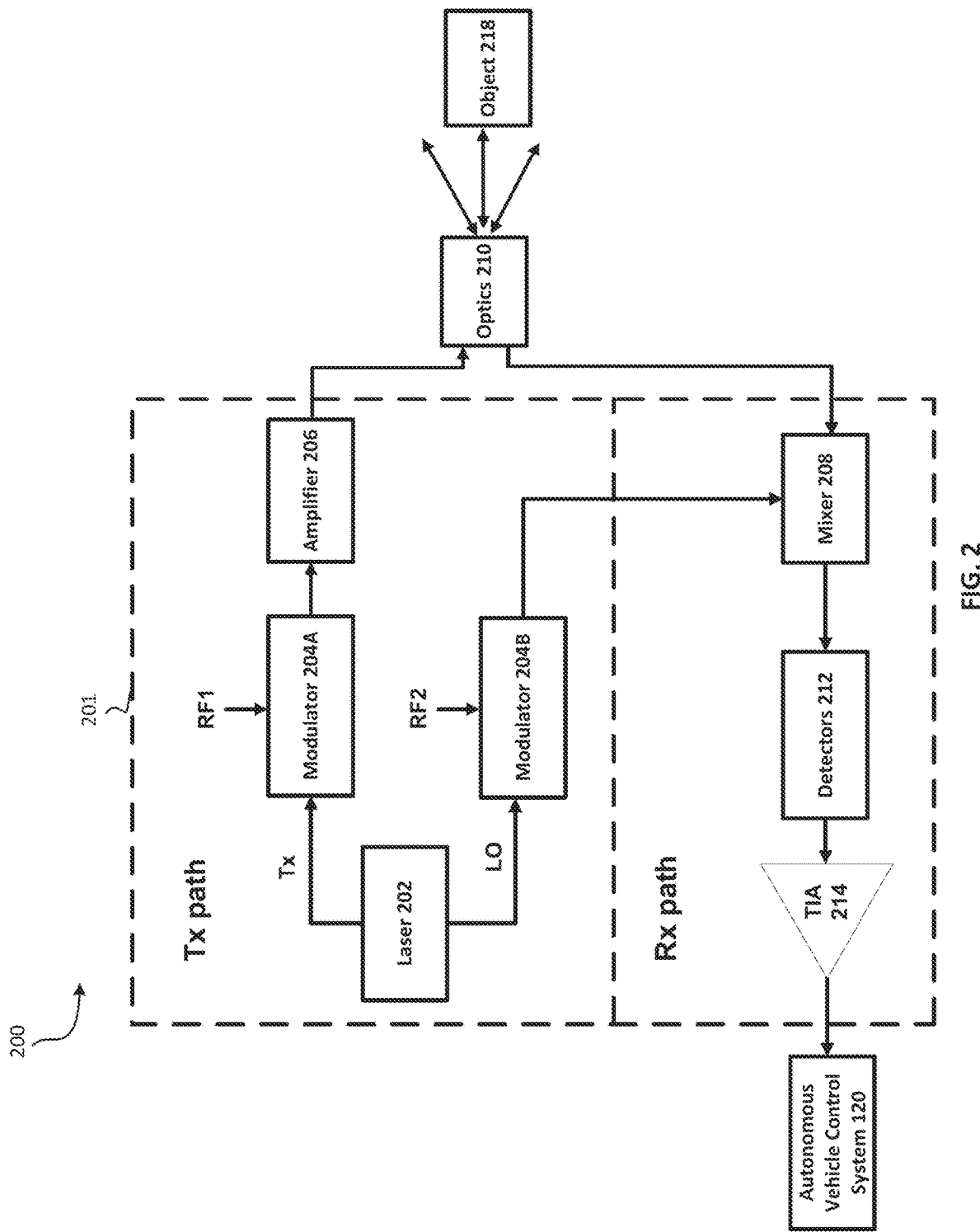

1000

```
┌─────────────────────────────────────────────────────────────┐
│ controlling, by the one or more processors, a laser to      │
│ provide an optical beam to a first input optical channel of │
│ a transceiver during a first time slot                      │
│                           1002                              │
└─────────────────────────────────────────────────────────────┘
                              ↓
┌─────────────────────────────────────────────────────────────┐
│ generating, by the transceiver responsive to receiving the  │
│ optical beam, a transverse electric (TE) reflected beam     │
│ and a transverse magnetic (TM) reflected beam               │
│                           1004                              │
└─────────────────────────────────────────────────────────────┘
                              ↓
┌─────────────────────────────────────────────────────────────┐
│ sending, by the transceiver, the TE reflected beam and the  │
│ TM reflected beam to a time-division multiplexing (TDM)     │
│ circuit via a first output channel of the transceiver       │
│                           1006                              │
└─────────────────────────────────────────────────────────────┘
                              ↓
┌─────────────────────────────────────────────────────────────┐
│ generating, by the TDM circuit, a first plurality of        │
│ electrical signals that are associated with the TM          │
│ reflected beam and the TE reflected beam                    │
│                           1008                              │
└─────────────────────────────────────────────────────────────┘
                              ↓
┌─────────────────────────────────────────────────────────────┐
│ controlling, by the one or more processors, the TDM circuit │
│ to select the first plurality of electrical signals during  │
│ the first time slot                                         │
│                           1010                              │
└─────────────────────────────────────────────────────────────┘
```

FIG. 10

LIDAR TRANSMIT/RECEIVE SYSTEM

CROSS-REFERENCE TO RELATED APPLICATIONS

This application is a Continuation of U.S. patent application Ser. No. 17/228,346, filed Apr. 12, 2021, which is a Continuation-in-Part to U.S. patent application Ser. No. 17/196,002, filed Mar. 9, 2021, which is a Continuation of U.S. patent application Ser. No. 16/915,404, filed Jun. 29, 2020, now U.S. Pat. No. 10,948,600, issued Mar. 16, 2021. The entire disclosure of U.S. patent application Ser. Nos. 16/915,404, 17/196,002 and 17/228,346 is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for combining multiple functions of a LIDAR system, to support the operation of a vehicle.

One implementations disclosed here is directed to a LIDAR system comprising one or more optical components configured to: receive an optical beam generated by a laser source; reproduce the optical beam as a plurality of optical beams; transmit, to an optical device, the plurality of optical beams via a first subset of optical paths; receive, from the optical device, a transverse electric (TE) reflected beam and a transverse magnetic (TM) reflected beam via a second subset of the optical paths; generate a first output signal by combining a first local oscillator (LO) signal and the TE reflected beam; and/or generate a second output signal by combining a second LO signal and the TM reflected beam.

In another aspect, the present disclosure is directed to a method of combining multiple functions of a light detection and ranging (LIDAR) system. The method includes receiving an optical beam generated by a laser source; reproducing the optical beam as a plurality of optical beams; transmitting, to an optical device, the plurality of optical beams via a first subset of optical paths; receiving from the optical device, a transverse electric (TE) reflected beam and a transverse magnetic (TM) reflected beam via a second subset of the optical paths; generating a first output signal by combining a first local oscillator (LO) signal and the TE reflected beam; and/or generating a second output signal by combining a second LO signal and the TM reflected beam.

In another aspect, the present disclosure is directed to an autonomous vehicle control system that includes one or more light detection and ranging (LIDAR) circuits configured to: receive an optical beam generated by a laser source; reproduce the optical beam as a plurality of optical beams; transmit, to an optical device, the plurality of optical beams via a first subset of optical paths; receive, from the optical device, a transverse electric (TE) reflected beam and a transverse magnetic (TM) reflected beam via a second subset of the optical paths; generate a first output signal by combining a first local oscillator (LO) signal and the TE reflected beam; and generate a second output signal by combining a second LO signal and the TM reflected beam; and one or more processors configured to control operation of an autonomous vehicle using the first output signal and the second output signal.

In another aspect, the present disclosure is directed to a LIDAR system comprising a transceiver comprising a plurality of input optical channels and a plurality of output optical channels; a laser source coupled to the transceiver; a time-division multiplexing (TDM) circuit configured to: generate a plurality of first signals that are associated with a transverse magnetic (TM) reflected beam and a transverse electric (TE) reflected beam; and one or more processors configured to: control the laser to provide an optical beam to a first input optical channel of the transceiver during a first time slot, causing the transceiver to send the TE reflected beam and the TM reflected to the TDM circuit via a first output channel of the transceiver; and control the TDM circuit to select the plurality of first signals during the first time slot.

In another aspect, the present disclosure is directed to a method of combining multiple functions of a light detection and ranging (LIDAR) system, the method comprising: controlling, by one or more processors, a laser to provide an optical beam to a first input optical channel of a transceiver during a first time slot; generating, by the transceiver responsive to receiving the optical beam, a transverse electric (TE) reflected beam and a transverse magnetic (TM) reflected beam; sending, by the transceiver, the TE reflected beam and the TM reflected beam to a time-division multiplexing (TDM) circuit via a first output channel of the transceiver; generating, by the TDM circuit, a plurality of first signals that are associated with the TM reflected beam and the TE reflected beam; and controlling, by the one or more processors, the TDM circuit to select the plurality of first signals during the first time slot.

In another aspect, the present disclosure is directed to an autonomous vehicle control system comprising: a transceiver comprising a plurality of input optical channels and a plurality of output optical channels; a laser source coupled to the transceiver; a time-division multiplexing (TDM) circuit configured to: generate a plurality of first signals that are associated with a transverse magnetic (TM) reflected beam and a transverse electric (TE) reflected beam; and one or more processors configured to: control the laser to provide an optical beam to a first input optical channel of the transceiver during a first time slot, causing the transceiver to send the TE reflected beam and the TM reflected to the TDM circuit via a first output channel of the transceiver; control the TDM circuit to select the plurality of first signals during the first time slot; and control operation of an autonomous vehicle according to the plurality of electrical signals.

In another aspect, the present disclosure is directed to a LIDAR system for a vehicle, including a laser source configured to generate light signals, a transceiver, and a fiber array coupled to the transceiver and including a plurality of output channels. The transceiver is configured to receive one or more light signals from the laser source through a first group of output channels of the fiber array, receive one or more local oscillator (LO) signals through a second group of output channels of the fiber array, transmit the one or more light signals into an environment of the vehicle, receive a first returned light reflected from one or more objects in the environment, and output the first returned light and a first LO signal of the one or more LO signals.

In another aspect, the present disclosure is directed to a method including generating light signals by a laser source. The method includes receiving one or more light signals from the laser source through a first group of output channels of a fiber array. The method includes receiving one or more local oscillator (LO) signals through a second group of output channels of the fiber array. The method includes transmitting the one or more light signals into an environment of a vehicle. The method includes receiving a first returned light reflected from one or more objects in the environment. The method includes outputting the first returned light and a first LO signal of the one or more LO signals.

In another aspect, the present disclosure is directed to an autonomous vehicle, including a light detection and ranging (LIDAR) system, a steering system, a braking system, and a vehicle controller. The laser source is configured to generate light signals. The fiber array is coupled to the transceiver and includes a plurality of output channels. The transceiver is configured to receive one or more light signals from the laser source through a first group of output channels of the fiber array, receive one or more local oscillator (LO) signals through a second group of output channels of the fiber array, transmit the one or more light signals into an environment of the vehicle, receive a first returned light reflected from one or more objects in the environment, and output the first returned light and a first LO signal of the one or more LO signals. The vehicle controller is configured to control operation of at least one of the steering system or the braking system based on the one or more light signals, the first returned light, and the first LO signal.

Still other aspects, features, and advantages are readily apparent from the following detailed description, simply by illustrating a number of particular implementations, including the best mode contemplated for carrying out the invention. Other implementations are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Implementations are illustrated by way of example, and not by way of limitation, in the figures of the accompanying drawings in which like reference numerals refer to similar elements and in which:

FIG. 2 is a block diagram illustrating an example environment of a LIDAR system for autonomous vehicles, according to some implementations;

FIG. 10 is a flow chart that illustrates an example method for combining multiple functions of a LIDAR system, according to an implementation.

DETAILED DESCRIPTION

Figure 1A:
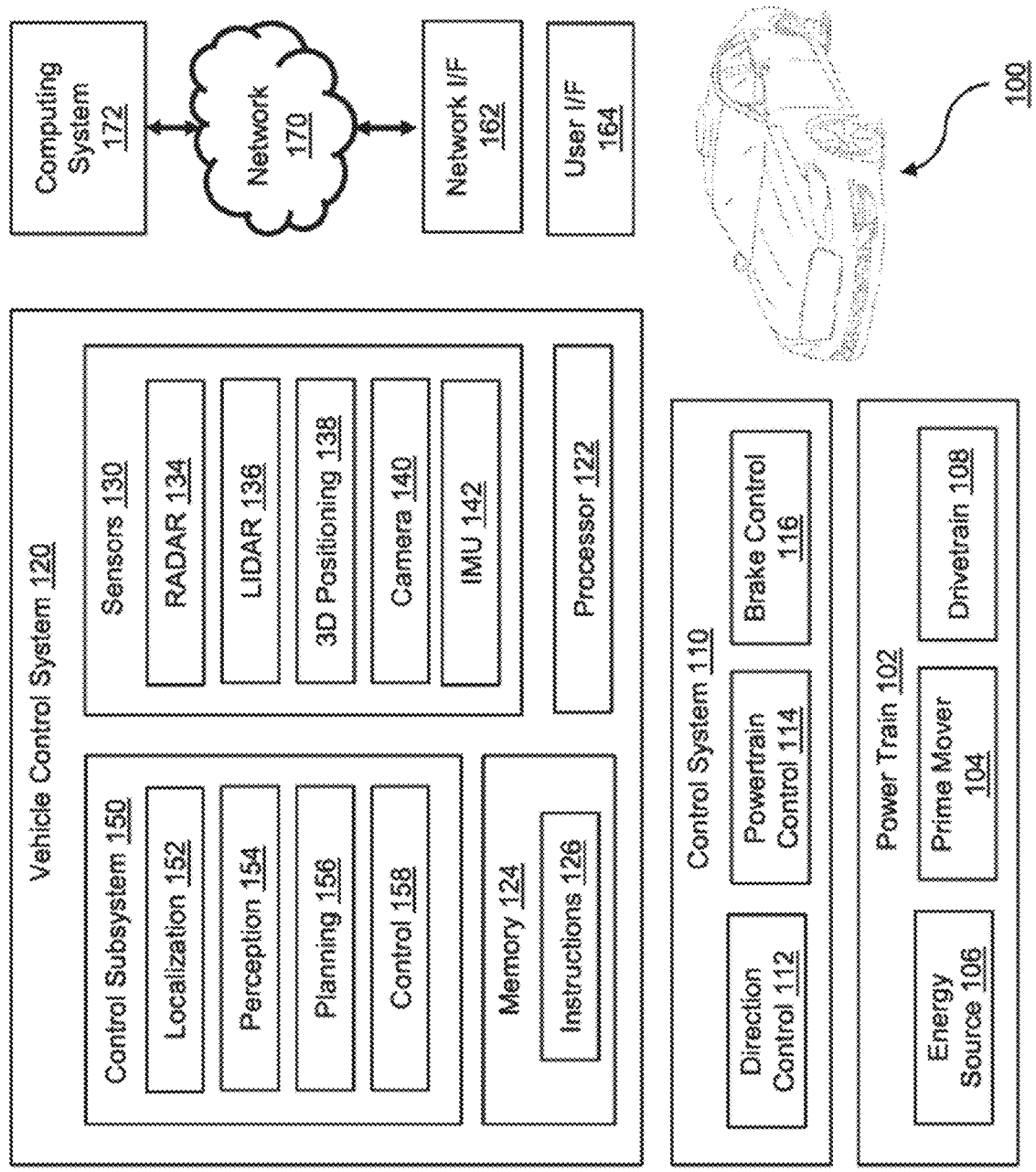
FIG. 1A is a block diagram illustrating an example of a system environment for autonomous vehicles according to some implementations.

A LIDAR system may include a transmit (Tx) path and a receive (Rx) path. The transmit (Tx) path may include a laser source for providing a light signal (sometimes referred to as, "beam") that is derived from (or associated with) a local oscillator (LO) signal, one or more modulators for modulating a phase and/or a frequency of the light signal using Continuous Wave (CW) modulation or quasi-CW modulation, and an amplifier for amplifying the modulated signal before sending the signal to optics (e.g., an oscillatory scanner, a unidirectional scanner, a Risley prism, a circulator optic, and/or a beam collimator, etc.).

The optics are configured to steer the amplified signal that it receives from the Tx path into an environment within a given field of view toward an object, receive a returned signal reflected back from the object, and provide the returned signal to the receive (RX) path.

The receive (Rx) path may include a mixer (e.g., 50/50) for mixing the LO signal with the returned signal to generate a down-converted signal, and a transimpedance amplifier (TIA) for amplifying the down-converted signal. The RX path provides the down-converted signal (now amplified) to an autonomous vehicle control system for determining a distance to the object and/or measuring the velocity of the object.

In conventional LIDAR systems, fiber coupling (sometimes referred to as, "fiber cable") is used to interconnect the Tx path, the Rx path, and the optics. The fiber coupling provides flexibility during testing and development of the LIDAR system in that it allows different channels to be used with different Tx/Rx apertures and optical circulation methods.

However, the bulkiness of fiber coupling limits the capability for a LIDAR designer to add additional channels—each requiring even more fiber coupling—and/or to scale the LIDAR system down to the dimensions required for efficient, automotive applications.

Accordingly, the present disclosure is directed to systems and methods for combining multiple functions (e.g., splitting, collecting, combining, redirecting, pairing, etc.) of a LIDAR system to support the operation of a vehicle.

As described in the below passages, in some implementations, a multi-channel dual polarization coherent (DPC) LIDAR transceiver is configured for time-domain multiplexing of optical signals by allowing the transmission of optical signals through a first group of its input/output (I/O) channels during a first time slot, and the transmission of optical signals through a second group of its I/O channels during a second time slot. The LIDAR system may also be configured for time-domain multiplexing of electrical signals (each corresponding to returned light received by the DPC LIDAR transceiver) by toggling the control lines of a network of multiplexers according to different times slots (e.g., first time slot, second time slot).

To illustrate, during the first time slot, when the first group of I/O channels are selected and/or enabled by the LIDAR system, a Tx path of the DPC LIDAR transceiver may receive, from a laser source, an optical beam via a first Tx input (e.g., channel, terminal), a first LO signal via a first LO input, and a second LO signal via a second LO input. The Tx path of the DPC LIDAR transceiver may split the optical beam into multiple optical beams, and provide emission of the optical beams into a free space via the Tx outputs.

An Rx path of the multi-channel DPC LIDAR transceiver may receive, via Rx inputs into one or more Rx waveguides, the returned light corresponding to transverse electric (TE) polarization and the returned light corresponding to transverse magnetic (TM) polarization which are each reflected back from one or more objects, where each of the Rx waveguides are paired with a respective Tx output of the Tx path.

The Rx path may split the first LO signal into multiple LO signals, which the Rx path then combines with the returned light corresponding to TE polarization (sometimes referred to as, "vertical polarization" or "perpendicular polarization"); and split the second LO signal into multiple LO signals, which the Rx path then combines with the returned light corresponding to TM polarization (sometimes referred to as, "horizontal polarization" or "parallel polarization").

The Rx path may provide, via Rx outputs, the combined signals to a plurality of paired detectors, whose outputs are coupled to a network of multiplexers. The detectors may generate and send the electrical signals associated with the TM returned light to first inputs of the multiplexers, and generate and send the electrical signals associated with the TE returned signals to second inputs of the multiplexers.

The LIDAR system may toggle the control lines of the multiplexers during TS#1 to cause the multiplexers to send the electrical signals on their respective input terminal to a set of analog-to-digital converters (ADCs), whose outputs are coupled to the LIDAR system.

During the second time slot, when the second group of I/O channels are selected and/or enabled by the LIDAR system, the Tx path of the DPC LIDAR transceiver may receive, from the laser source, an optical beam via a second Tx input, a third LO signal via a third LO input, and a fourth LO signal via a fourth LO input. Likewise, the DPC LIDAR transceiver may perform the same operations (e.g., splitting, emitting, receiving, combining, etc.) that it performed on the signals of the first group of I/O channels on the signals of the second group of I/O channels, thereby causing the same (shared) detectors to generate and send the electrical signals associated with the TM returned light to first inputs of the multiplexers, and generate and send the electrical signals associated with the TE returned signals to second inputs of the multiplexers.

The LIDAR system may toggle the control lines of the multiplexers during the second time slot to cause the multiplexers to send the electrical signals on their respective input terminals to a set of ADCs, whose outputs are coupled to the LIDAR system.

Various example implementations described herein may include one or more of the following features: (1) the Tx inputs of the DPC LIDAR transceiver may be divided into inputs that are split among multiple channels (e.g., 4) each, which may improve matching with a LIDAR engine architecture; (2) the LO inputs are spread across multiple (e.g., 8) balanced photodiode pairs (e.g., detectors), (3) the Tx/Rx outputs to free space may occur along one edge of the DPC LIDAR transceiver with waveguides interleaving the Tx/Rx outputs (e.g., Rx-Tx-Rx-Tx . . . , etc.), where the Tx pitch is defined by the requirements of the free space circulation and/or beam collimation optics; (4) the LO and Tx inputs may be paired (e.g., LO_A, Tx_A; LO_B, Tx_B) to function as independent subsystems; (5) the input power levels to the Tx inputs may be large (e.g., >1 Watt each); (6) the fiber to the DPC LIDAR transceiver input coupling may accept high power; (7) the scattering of the Tx paths (sometimes referred to as, "directivity") into the Rx paths (e.g., toward the detector) may be very small (e.g., >65 dB for TM beams to TM beams, >84 dB for TM beams to TE beams) while being interleaved; (8) reflections from the output faces maybe minimized (e.g., an Angled polish of the DPC LIDAR transceiver and/or an anti-reflective coating at 1550 nm may be used); (9) as the output beam quality may be defined by the output of the waveguide, the output mode of the DPC LIDAR transceiver must have high quality (e.g., a low distortion from a transverse electromagnetic (TEM00) beam); (10) the functions (e.g., splitting, collecting, combining, redirecting, pairing, etc.) of a LIDAR system may be combined into one integrated photonic device; (11) the DPC LIDAR transceiver may be implemented using a programmable logic controller (PLC), (12) DPC LIDAR transceiver includes a dual polarization receiver, (13) the DPC LIDAR transceiver includes multiplexers and the sharing of photodetectors channels on multiple waveguide outputs in order to support the time-division multiplexing (TDM) of beams, and (14) to reduce the effect of stray (e.g., uncoupled) light reaching one or more of the detectors, the DPC LIDAR transceiver may use polarization extinction and/or a configuration that causes the effective overlapping of the transmitted/received signals with the LO signals to occur in the mode-field area of the waveguide that is coupled to the detector rather than in the physical detector area.

Thus, the present disclosure provides a way to reduce resources of a LIDAR architecture by time multiplexing beams, made possible by using of a network of electronic multiplexers and/or by sharing photodetector channels on multiple waveguide outputs.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. System Environment for Autonomous Vehicles

FIG. 1A is a block diagram illustrating an example of a system environment for autonomous vehicles according to some implementations.

Referring to FIG. 1A, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may include one or more processors, for example, a microprocessor (not shown). The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

A truck can include a LIDAR system (e.g., vehicle control system 120 in FIG. 1A, LIDAR system 201 in FIG. 2, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5400 nm; and far infrared: 5400 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
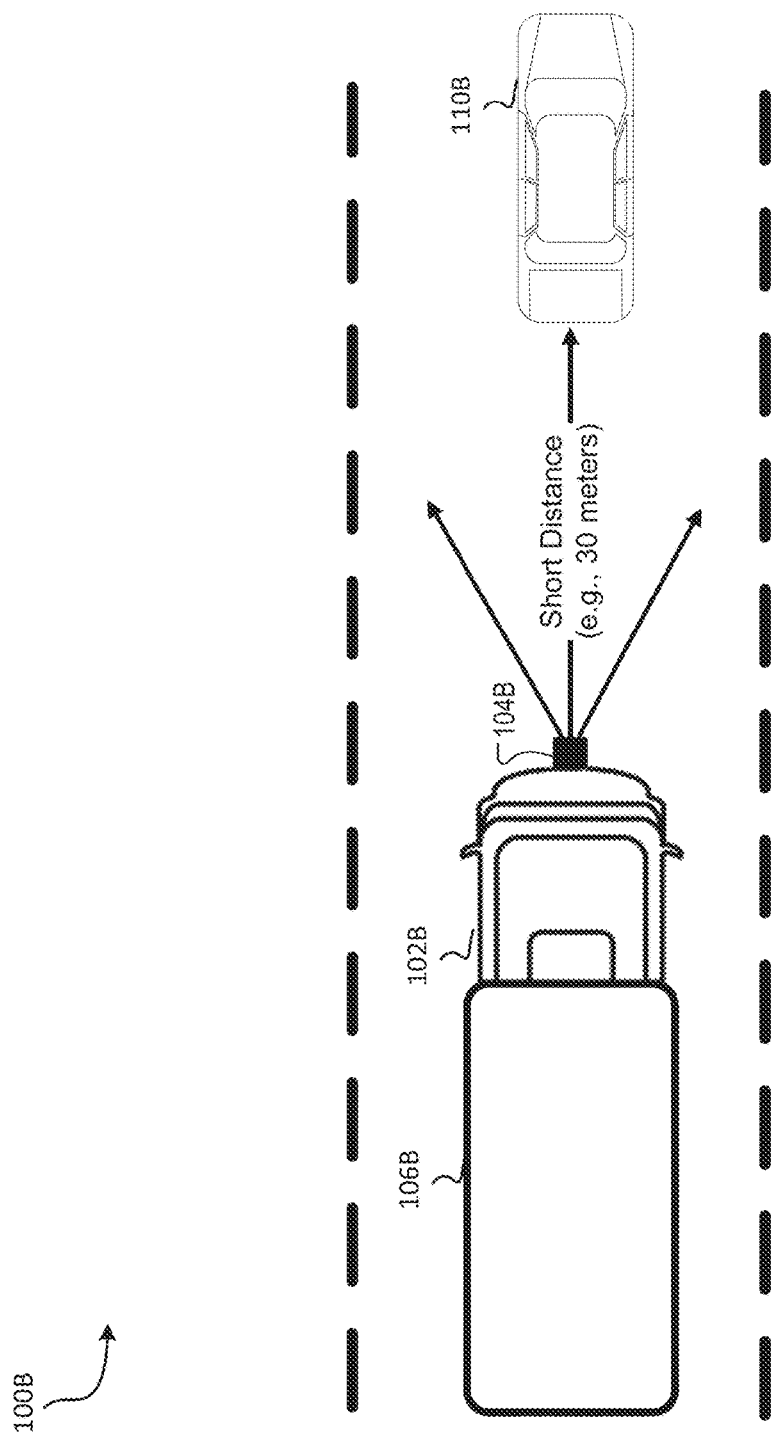
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 201 in FIG. 2, etc.) for determining a distance to the object 110B and/or measuring the velocity of the object 110B. Although FIG. 1B shows that one LIDAR system 104B is mounted on the front of the commercial truck 102B, the number of LIAR system and the mounting area of the LIAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
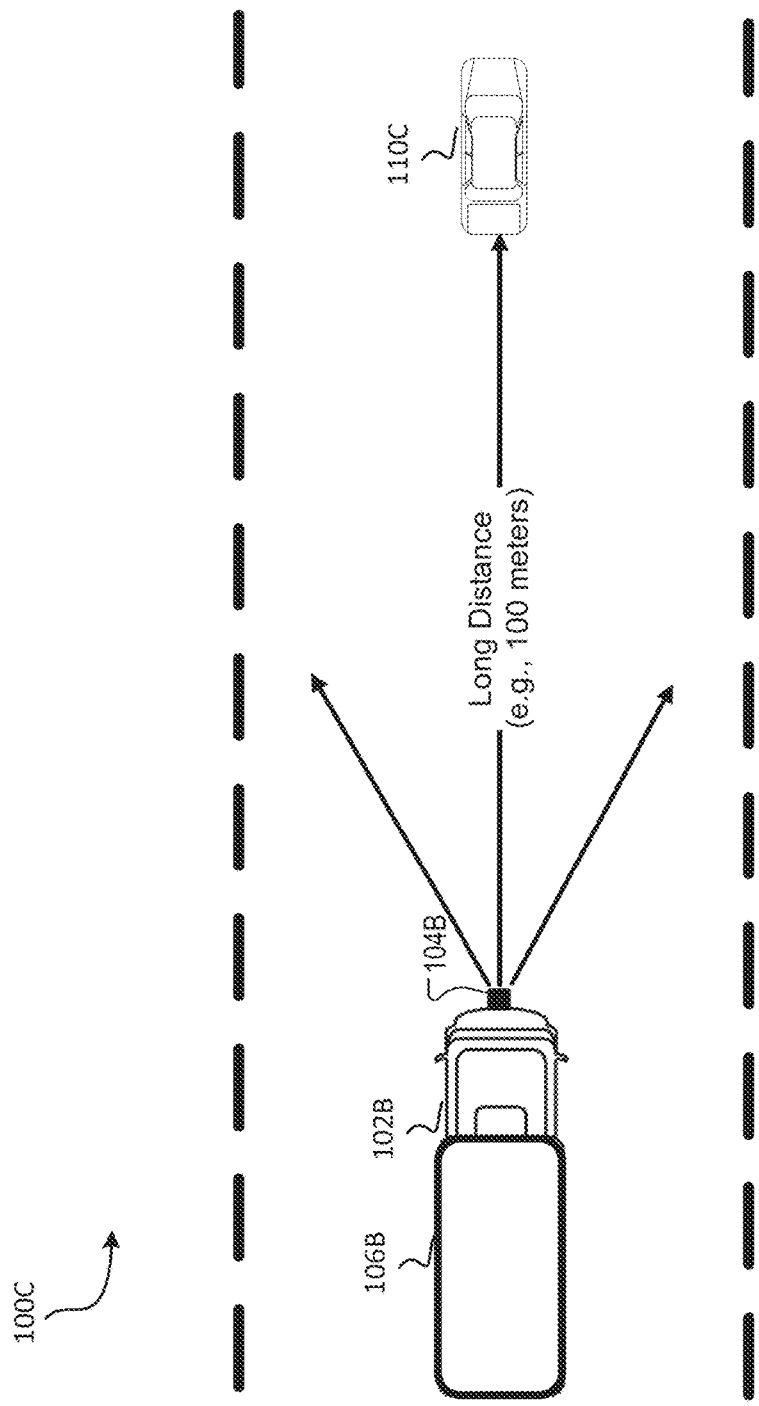
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
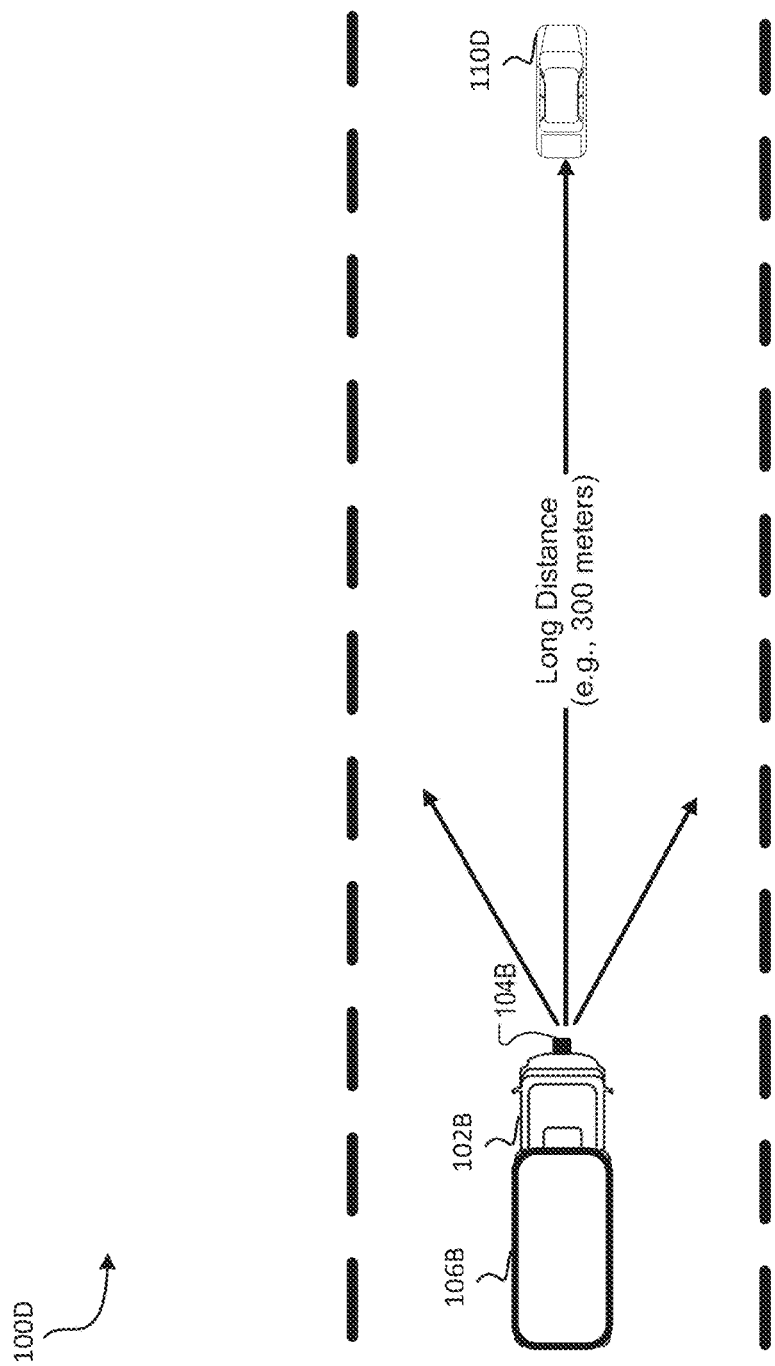
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. Continuous Wave Modulation and Quasi-Continuous Wave Modulation

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

4. LIDAR System for Autonomous Vehicles

FIG. 2 is a block diagram illustrating an example environment of a LIDAR system for autonomous vehicles, according to some implementations. The environment 200 includes a LIDAR system 201 that includes a transmit (Tx) path and a receive (Rx) path. The Tx path includes one or more Tx input/output ports (not shown in FIG. 2) and the Rx path includes one or more Rx input/output ports (not shown in FIG. 2). In some implementations, the LIDAR system may include at least one of an electrical circuit, an electro-optical component, or an optical component, configured to perform the functions described in the present disclosure.

In some implementations, a semiconductor substrate and/or semiconductor package may include the Tx path and the Rx. In some implementations, a first semiconductor substrate and/or a first semiconductor package may include the Tx path and a second semiconductor substrate and/or second semiconductor package may include the Rx path. In some arrangements, the Rx input/output ports and/or the Tx input/output ports may occur along one or more edges of one or more semiconductor substrates and/or semiconductor packages.

The environment 200 includes one or more optics 210 (e.g., an oscillatory scanner, a unidirectional scanner, a Risley prism, a circulator optic, and/or a beam collimator, etc.) that are coupled to the LIDAR system 201. In some implementations, the one or more optics 210 may be coupled to the Tx path via the one or more Tx input/output ports. In some implementations, the one or more optics 210 may be coupled to the Rx path via the one or more Rx input/output ports.

The environment 200 includes a vehicle control system 120 (e.g., vehicle control system 120 in FIG. 1) that is coupled to the LIDAR system 201. In some implementations, the vehicle control system 120 may be coupled to the Rx path via the one or more Rx input/output ports.

The Tx path includes a laser source 202, a modulator 204A, a modulator 204B, and an amplifier 206. The Rx path includes a mixer 208, a detector 212, and a transimpedance amplifier (TIA) 212. Although FIG. 2 shows only a select number of components and only one input/output channel; the environment 200 may include any number of components and/or input/output channels (in any combination) that are interconnected in any arrangement to facilitate combining multiple functions of a LIDAR system, to support the operation of a vehicle.

The laser source 202 is configured to generate a light signal that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1400 nanometers.

The laser source 202 is configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A is configured to send the modulated light signal to the amplifier 206. The amplifier 206 is configured to amplify the modulated light signal to generate an amplified light signal to the optics 210.

The optics 210 are configured to steer the amplified light signal that it receives from the Tx path into an environment within a given field of view toward an object 218, receive a returned signal reflected back from the object 218, and provide the returned signal to the mixer 208 of the Rx path.

The laser source 202 is configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 is configured to mix (e.g., combine, multiply, etc.) the modulated LO signal with the returned signal to generate a down-converted signal and send the down-converted signal to the detector 212. In some arrangements, the mixer 208 is configured to send the modulated LO signal to the detector 212.

The detector 212 is configured to generate an electrical signal based on the down-converted signal and send the electrical signal to the TIA 214. In some arrangements, the detector 212 is configured to generate an electrical signal based on the down-converted signal and the modulated signal.

The TIA 214 is configured to amplify the electrical signal and send the amplified electrical signal to the vehicle control system 120.

In some implementations, the TIA 214 may have a peak noise-equivalent power (NEP) that is less than 5 picoWatts per square root Hertz (i.e., $5 \times 10^{-12}$ Watts per square root Hertz). In some implementations, the TIA 214 may have a gain between 4 kiloohms and 25 kiloohms In some implementations, detector 212 and/or TIA 214 may have a 3 decibel bandwidth between 80 kilohertz (kHz) and 450 megahertz (MHz).

The vehicle control system 120 is configured to determine a distance to the object 218 and/or measures the velocity of the object 218 based on the one or more electrical signals that it receives from the TIA.

In some implementations, modulator 204A and/or modulator 204B may have a bandwidth between 400 megahertz (MHz) and 1000 (MHz).

4.1 Coherent LIDAR Transceiver with Multiple Channels

Figure 3:
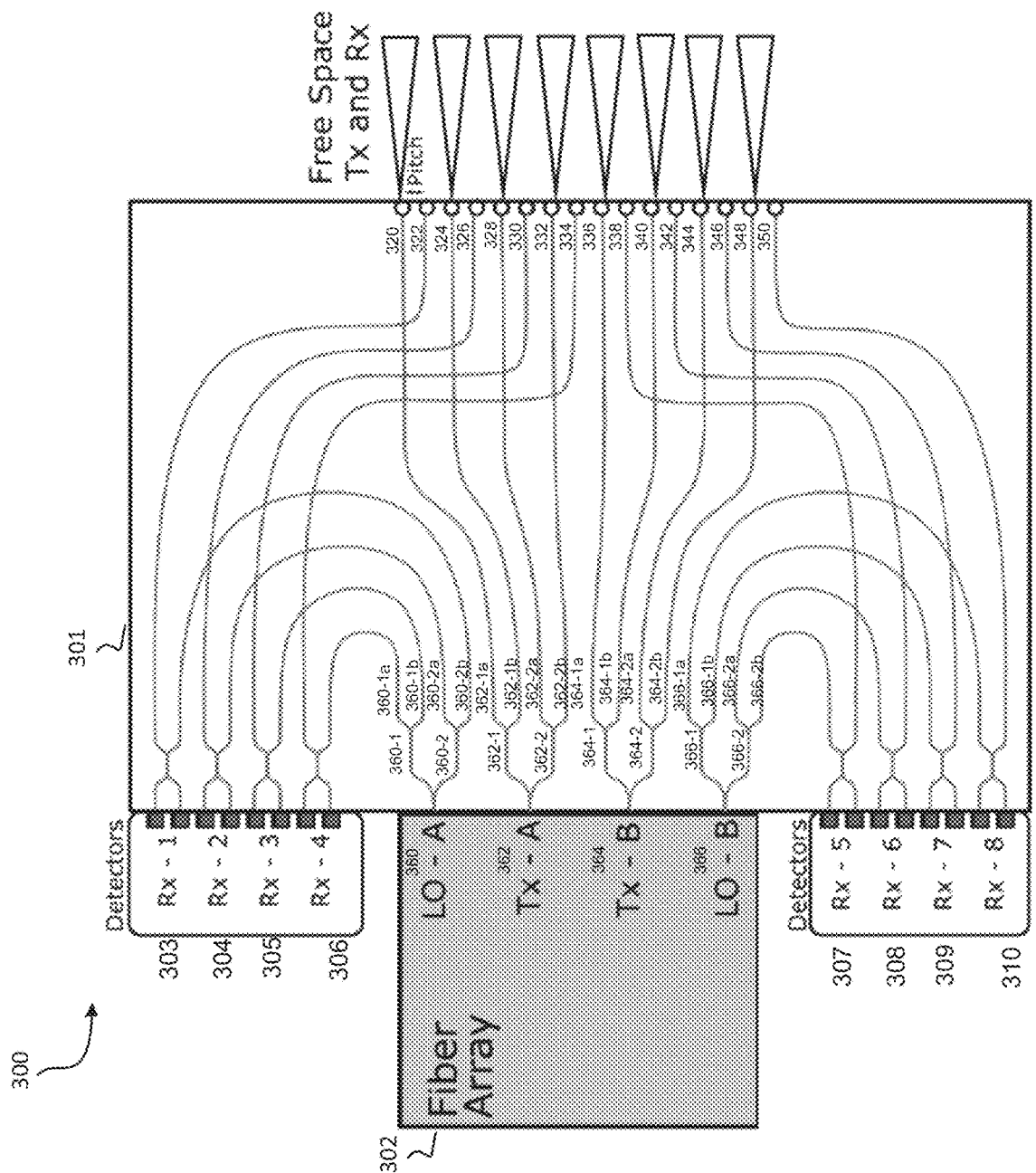
FIG. 3 is a block diagram depicting an example coherent LIDAR transceiver for operating a vehicle, according to some implementations.

FIG. 3 is a block diagram depicting an example coherent LIDAR transceiver for operating a vehicle, according to some implementations. The environment 300 includes a coherent LIDAR transceiver 301 and detectors 303, 304, 305, 306, 307, 308, 309, 310 (collectively referred to as, "detectors 303-310"). A laser source (e.g., laser source 202 in FIG. 2) generates an LO signal via a Tx path (e.g., the Tx path in FIG. 2) and provides the LO signal (modulated or unmodulated) to an LO input 360 (shown in FIG. 3 as, "LOA-A"). In some implementations, the LO signal at the LO input 360 is less than 5 milliwatts.

The coherent LIDAR transceiver 301 splits the LO signal received at the LO input 360 into LO signal 360-1 and LO signal 360-2. The coherent LIDAR transceiver 301 splits LO signal 360-1 into LO signal 360-1a and LO signal 360-1b. The coherent LIDAR transceiver 301 splits LO signal 360-2 into LO signal 360-2a and LO signal 360-2b.

The laser source provides the LO signal (modulated or unmodulated) to an LO input 366 (shown in FIG. 3 as, "LOA-B"). The coherent LIDAR transceiver 301 splits the LO signal received at the LO input 366 into LO signal 366-1 and LO signal 366-2. The coherent LIDAR transceiver 301 splits LO signal 366-1 into LO signal 366-1a and LO signal 366-1b. The coherent LIDAR transceiver 301 splits LO signal 366-2 into LO signal 366-2a and LO signal 366-2b.

The laser source generates a light signal via a Tx path (e.g., the Tx path in FIG. 2) and provides the light signal (modulated or unmodulated) to a Tx input 362 (shown in FIG. 3 as, "Tx-A"). The coherent LIDAR transceiver 301 splits the light signal received at the Tx input 362 into light signal 362-1 and light signal 362-2. The coherent LIDAR transceiver 301 splits light signal 362-1 into light signal 362-1a and light signal 362-1b. The coherent LIDAR transceiver 301 splits light signal 362-2 into light signal 362-2a and light signal 362-2b.

The laser source provides the light signal (modulated or unmodulated) to a Tx input 364 (shown in FIG. 3 as, "Tx-B"). The coherent LIDAR transceiver 301 splits the light signal received at the Tx input 364 into light signal 364-1 and light signal 364-2. The coherent LIDAR transceiver 301 splits light signal 364-1 into light signal 364-1a and light signal 364-1b. The coherent LIDAR transceiver 301 splits light signal 364-2 into light signal 364-2a and light signal 364-2b.

The coherent LIDAR transceiver 301 provides emission of the light signal 362-1*a* into free space toward one or more objects via Tx output 320, receives the returned light reflected back from an object via Rx input 322, and provides the returned light and LO signal 360-2*b* to detector 303 (shown in FIG. 3 as, "Rx-1"). The detector 303 generates an electrical signal based on the returned light and/or the LO signal 360-2*b*.

The coherent LIDAR transceiver 301 provides emission of the light signal 362-1*b* into free space toward one or more objects via Tx output 324, receives the returned light reflected back from an object via Rx input 326, and provides the returned light and LO signal 360-2*a* to detector 304 (shown in FIG. 3 as, "Rx-2"). The detector 304 generates an electrical signal based on the returned light and/or the LO signal 360-2*a*.

The coherent LIDAR transceiver 301 provides emission of the light signal 362-2*a* into free space toward one or more objects via Tx output 328, receives the returned light reflected back from an object via Rx input 330, and provides the returned light and LO signal 360-1*b* to detector 305 (shown in FIG. 3 as, "Rx-3"). The detector 305 generates an electrical signal based on the returned light and/or the LO signal 360-1*b*.

The coherent LIDAR transceiver 301 provides emission of the light signal 362-2*b* into free space toward one or more objects via Tx output 332, receives the returned light reflected back from an object via Rx input 334, and provides the returned light and LO signal 360-1*a* to detector 306 (shown in FIG. 3 as, "Rx-4"). The detector 306 generates an electrical signal based on the returned light and/or the LO signal 360-1*a*.

The coherent LIDAR transceiver 301 provides emission of the light signal 364-1*a* into free space toward one or more objects via Tx output 336, receives the returned light reflected back from an object via Rx input 338, and provides the returned light and LO signal 366-2*b* to detector 307 (shown in FIG. 3 as, "Rx-5"). The detector 307 generates an electrical signal based on the returned light and/or the LO signal 366-2*b*.

The coherent LIDAR transceiver 301 provides emission of the light signal 364-1*b* into free space toward one or more objects via Tx output 340, receives the returned light reflected back from an object via Rx input 342, and provides the returned light and LO signal 366-2*a* to detector 308 (shown in FIG. 3 as, "Rx-6"). The detector 308 generates an electrical signal based on the returned light and/or the LO signal 366-2*a*.

The coherent LIDAR transceiver 301 provides emission of the light signal 364-2*a* into free space toward one or more objects via Tx output 344, receives the returned light reflected back from an object via Rx input 346, and provides the returned light and LO signal 366-1*b* to detector 309 (shown in FIG. 3 as, "Rx-7"). The detector 309 generates an electrical signal based on the returned light and/or the LO signal 366-1*b*.

The coherent LIDAR transceiver 301 provides emission of the light signal 364-2*b* into free space toward one or more objects via Tx output 348, receives the returned light reflected back from an object via Rx input 350, and provides the returned light and LO signal 366-1*a* to detector 310 (shown in FIG. 3 as, "Rx-8"). The detector 310 generates an electrical signal based on the returned light and/or the LO signal 366-1*a*.

4.2 Dual Polarization Coherent LIDAR Transceiver with Multiple Channels

Figure 4:
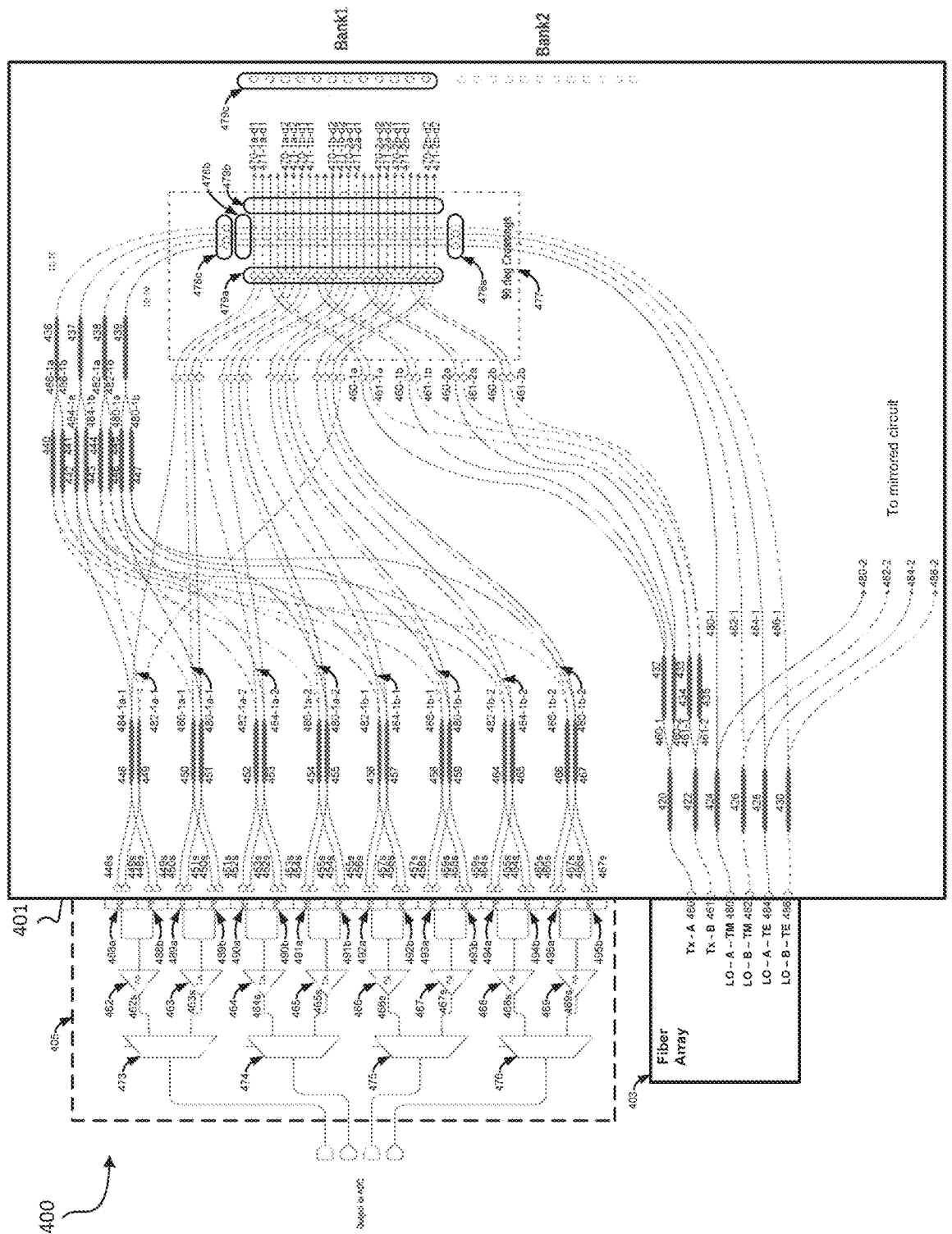
FIG. 4 is a block diagram depicting an example dual polarization coherent LIDAR transceiver for operating a vehicle, according to some implementations.

FIG. 4 is a block diagram depicting an example dual polarization coherent (DPC) LIDAR transceiver for operating a vehicle, according to some implementations. The environment 400 includes a DPC LIDAR transceiver 401 (sometimes referred to as, "a LIDAR system"), detectors 488*a*, 488*b*, 489*a*, 489*b*, 490*a*, 490*b*, 491*a*, 491*b*, 492*a*, 492*b*, 493*a*, 493*b*, 494*a*, 494*b*, 495*a*, and 495*b* (collectively referred to as, "detectors 488-495"), transimpedance amplifiers (TIA) 462, 463, 464, 465, 466, 467, 468, and 469 (collectively referred to as, "TIAs 462-469"), and multiplexers 473, 474, 475, and 476 (collectively referred to as, "multiplexers 473-476" or "network of multiplexers"). In some implementations, the detectors 488-495, the TIAs 462-469, and/or the multiplexers 473-476 may be included in time-division multiplexing (TDM) circuit 405.

The DPC LIDAR transceiver 401 includes a Tx/LO path and an Rx path. The Tx/LO path includes a first set of splitters 420, 422, 424, 426, 428, 430, 432, 433, 434, 435 (e.g., 50/50; collectively referred to as, "splitters 420-435") and a second set of splitters 436, 437, 438, 439, 440, 441, 442, 443, 444, 445, 446, 447 (collectively referred to as, "splitters 436-447"). The Rx path includes couplers 448, 449, 450, 451, 452, 453, 454, 455, 456, 457, 458, 459, 464, 465, 466, and 467 (e.g., 2×2; collectively referred to as, "couplers 448-467").

The DPC LIDAR transceiver 401 includes a multi-input multi-output (MIMO) waveguide 477 that couples (e.g., connects, combines, links) the Tx/LO path to the Rx path. The MIMO waveguide 477 includes a set of inputs 478*a*, a set of inputs 479*a*, optical paths 478*b*, optical paths 479*b*, a set of outputs 478*c*, and a set of outputs 479*c*. The optical paths 478*b* couple the set of inputs 478*a* to the set of outputs 478*c*. The optical paths 479*b* couple the set of inputs 479*a* to the set of outputs 479*c*.

In some implementations, the optical paths 478*b* cross (e.g., overlap, intersect, traverse) the optical paths 479*c* at a crossing point (sometimes referred to as a "perpendicular crossing point" or "orthogonal crossing point"), such that the optical paths 478*b*, 479*c* form an angle that is equal to, or substantially (e.g., within +/−5 degrees) equal to, 90 degrees. In some implementations, the optical paths 478*b* cross (e.g., overlap, intersect, traverse) the optical paths 479*c* at a crossing point, such that the optical paths 478*b*, 479*c* form an angle that is either less than 85 degrees or greater than 95 degrees.

The DPC LIDAR transceiver 301 includes a mirrored circuit (not shown in FIG. 4) that mirrors (e.g., reproduces, replicates, repeats) the functionality of the components (e.g., splitters, couplers, waveguide) of the DPC LIDAR transceiver 301 that are shown in environment 400. In other words, the mirrored circuit includes a third set of splitters that correspond to splitters 420-435, a fourth set of splitters that correspond to splitters 436-447, a MIMO waveguide that corresponds to MIMO waveguide 477, a set of couplers that correspond to couplers 448-467, a set of detectors that correspond to detectors 488-495, a set of transimpedance amplifiers that correspond to TIAs 462-469, and a set of multiplexers that correspond to multiplexers 473-476. Accordingly, the mirrored circuit expands the DPC LIDAR transceiver 301 shown in FIG. 4 from an 8-channel DPC LIDAR transceiver with two detectors per channel to a 16-channel DPC LIDAR transceiver with two detectors per channel. In some implementations, the ordering of the transverse magnetic signals (e.g., Lo-A-TM, LO-B-TM) and the transverse electric signals (e.g., LO-A-TE, LO-B-TE) may be reversed from the ordering shown in the environment 400.

In some implementations, a semiconductor substrate and/or semiconductor package may include the DPC LIDAR transceiver 401. For example, the DPC LIDAR transceiver 401 (and its internal components) may be disposed on a semiconductor substrate. In some implementations, a semiconductor substrate and/or semiconductor package may include the DPC LIDAR transceiver 401 and the TDM circuit 405. In some implementations, a first semiconductor substrate and/or package may include the DPC LIDAR transceiver 401, and a second semiconductor substrate and/or package may include the TDM circuit 405.

A laser source (e.g., laser source 202 in FIG. 2) generates an LO signal via a Tx path (e.g., the Tx path in FIG. 2) and provides the LO signal (modulated or unmodulated) to an LO input 480 (shown in FIG. 4 as, "LO-A-TM") that is associated with Group 'A' and one or more transverse magnetic (TM) signals. The laser source provides the LO signal to the LO input 480 via a fiber array 403. In some implementations, the optical input power of the LO signal at the LO input 480 is less than 5 milliwatts.

The splitter 424 is configured to split (e.g., reproduce, divide, duplicate) the LO signal that is received at the LO input 480 into LO signal 480-1 and LO signal 480-2. The splitter 424 is configured to send (e.g., provide, deliver, transmit) the LO signal 480-1 to a respective input of the set of inputs 478a of the MIMO waveguide 477, and the LO signal 480-2 to a corresponding input of the MIMO waveguide of the mirrored circuit. The LO signal 480-1 travels (e.g., traverses, propagates, passes through) across the optical paths 478b to a respective output of the set of outputs 478c, causing the MIMO waveguide 477 to send the LO signal 480-1 to splitter 439.

The splitter 439 is configured to split the LO signal 480-1 into LO signal 480-1a and LO signal 480-1b, and send the LO signal 480-1a to splitter 446 and the LO signal 480-1b to splitter 447. The splitter 446 is configured to split the LO signal 480-1a into LO signal 480-1a-1 and LO signal 480-1a-2, and send the LO signal 480-1a-1 to coupler 451 and the LO signal 480-1a-2 to coupler 455. The splitter 447 is configured to split the LO signal 480-1b into LO signal 480-1b-1 and LO signal 480-1b-2, and send the LO signal 480-1b-1 to coupler 459 and the LO signal 480-1b-2 to coupler 467.

The laser source provides the LO signal (modulated or unmodulated) to an LO input 482 (shown in FIG. 4 as, "LO-B-TM") that is associated with Group 'B' and one or more transverse magnetic (TM) signals. The laser source provides the LO signal to the LO input 482 via the fiber array 403. In some implementations, the optical input power of the LO signal at the LO input 482 is less than 5 milliwatts.

The splitter 426 is configured to split the LO signal that is received at the LO input 482 into LO signal 482-1 and LO signal 482-2. The splitter 426 is configured to send the LO signal 482-1 to a respective input of the set of inputs 478a of the MIMO waveguide 477, and the LO signal 482-2 to a corresponding input of the MIMO waveguide of the mirrored circuit. The LO signal 482-1 travels across the optical path 478b (i.e., a respective path of the optical paths 478b) to a respective output of the set of outputs 478c, causing the MIMO waveguide 477 to send the LO signal 482-1 to splitter 438.

The splitter 438 is configured to split the LO signal 482-1 into LO signal 482-1a and LO signal 482-1b, and send the LO signal 482-1a to splitter 444 and the LO signal 482-1b to splitter 445. The splitter 444 is configured to split the LO signal 482-1a into LO signal 482-1a-1 and LO signal 482-1a-2, and send the LO signal 482-1a-1 to coupler 449 and the LO signal 482-1a-2 to coupler 452. The splitter 445 is configured to split the LO signal 482-1b into LO signal 482-1b-1 and LO signal 482-1b-2, and send the LO signal 482-1b-1 to coupler 456 and the LO signal 482-1b-2 to coupler 464.

The laser source provides the LO signal (modulated or unmodulated) to an LO input 484 (shown in FIG. 4 as, "LO-A-TE") that is associated with Group 'A' and one or more transverse electric (TE) signals. The laser source provides the LO signal to the LO input 484 via the fiber array 403. In some implementations, the optical input power of the LO signal at the LO input 484 is less than 5 milliwatts.

The splitter 428 is configured to split the LO signal that is received at the LO input 484 into LO signal 484-1 and LO signal 484-2. The splitter 428 is configured to send the LO signal 484-1 to a respective input of the set of inputs 478a of the MIMO waveguide 477, and the LO signal 484-2 to a corresponding input of the MIMO waveguide of the mirrored circuit. The LO signal 484-1 travels across the optical path 478b to a respective output of the set of outputs 478c, causing the MIMO waveguide 477 to send the LO signal 484-1 to splitter 437.

The splitter 437 is configured to split the LO signal 484-1 into LO signal 484-1a and LO signal 484-1b, and send the LO signal 484-1a to splitter 442 and the LO signal 484-1b to splitter 443. The splitter 442 is configured to split the LO signal 484-1a into LO signal 484-1a-1 and LO signal 484-1a-2, and send the LO signal 484-1a-1 to coupler 448 and the LO signal 484-1a-2 to coupler 453. The splitter 443 is configured to split the LO signal 484-1b into LO signal 484-1b-1 and LO signal 484-1b-2, and send the LO signal 484-1b-1 to coupler 457 and the LO signal 484-1b-2 to coupler 465.

The laser source provides the LO signal (modulated or unmodulated) to an LO input 486 (shown in FIG. 4 as, "LO-B-TE") that is associated with Group 'B' and one or more transverse electric (TE) signals. The laser source provides the LO signal to the LO input 486 via the fiber array 403. In some implementations, the optical input power of the LO signal at the LO input 486 is less than 5 milliwatts.

The splitter 430 is configured to split the LO signal that is received at the LO input 486 into LO signal 486-1 and LO signal 486-2. The splitter 430 is configured to send the LO signal 486-1 to a respective input of the set of inputs 478a of the MIMO waveguide 477, and the LO signal 486-2 to a corresponding input of the MIMO waveguide of the mirrored circuit. The LO signal 486-1 travels across the optical path 478b to a respective output of the set of outputs 478c, causing the MIMO waveguide 477 to send the LO signal 486-1 to splitter 436.

The splitter 436 is configured to split the LO signal 486-1 into LO signal 486-1a and LO signal 486-1b, and send the LO signal 486-1a to splitter 440 and the LO signal 486-1b to splitter 441. The splitter 440 is configured to split the LO signal 486-1a into LO signal 486-1a-1 and LO signal 486-1a-2, and send the LO signal 486-1a-1 to coupler 450 and the LO signal 486-1a-2 to coupler 454. The splitter 441 is configured to split the LO signal 486-1b into LO signal 486-1b-1 and LO signal 486-1b-2, and send the LO signal 486-1b-1 to coupler 458 and the LO signal 486-1b-2 to coupler 466.

The laser source generates (e.g., produces, constructs) a light signal via a Tx path (e.g., the Tx path in FIG. 2) and provides the light signal (modulated or unmodulated) to a Tx input 460 (shown in FIG. 3 as, "Tx-A"). The laser source provides the light signal to the Tx input 460 via the fiber array 403.

The splitter 420 is configured to split the light signal received at the Tx input 460 into light signal 460-1 and light signal 460-2, and send the light signal 460-1 to the splitter 432 and the light signal 460-2 to the splitter 433.

The splitter 432 is configured to split the light signal 460-1 into light signal 460-1a and light signal 460-1b, and send the light signal 460-1a and the light signal 460-1b to respective inputs of the set of inputs 479a of the MIMO waveguide 477. The light signal 460-1a and the light signal 460-1b travel across the optical path 479b to respective outputs of the set of outputs 479b of the MIMO waveguide 477.

The splitter 433 is configured to split the light signal 460-2 into light signal 460-2a and light signal 460-2b, and send the light signal 460-2a and the light signal 460-2b to respective inputs of the set of inputs 479a of the MIMO waveguide 477. The light signal 460-2a and the light signal 460-2b travel across the optical path 479b to respective outputs of the set of outputs 479b of the MIMO waveguide 477.

The laser provides the light signal (modulated or unmodulated) to a Tx input 461 (shown in FIG. 3 as, "Tx-B"). The laser source provides the light signal to the Tx input 461 via the fiber array 403.

The splitter 422 is configured to split the light signal received at the Tx input 461 into light signal 461-1 and light signal 461-2, and send the light signal 461-1 to the splitter 434 and the light signal 461-2 to the splitter 435.

The splitter 434 is configured to split the light signal 461-1 into light signal 461-1a and light signal 461-1b, and send the light signal 461-1a and the light signal 461-1b to respective inputs of the set of inputs 479a of the MIMO waveguide 477. The light signal 461-1a and the light signal 461-1b travel across the optical path 479b to respective outputs of the set of outputs 479b of the MIMO waveguide 477.

The splitter 435 is configured to split the light signal 461-2 into light signal 461-2a and light signal 461-2b, and send the light signal 461-2a and the light signal 461-2b to respective inputs of the set of inputs 479a of the MIMO waveguide 477. The light signal 461-2a and the light signal 461-2b travel across the optical path 479b to respective outputs of the set of outputs 479b of the MIMO waveguide 477.

The DPC LIDAR transceiver 401 provides emission of the light signal 460-1a into free space toward one or more objects and receives the returned light (polarized) that is reflected back from an object. The DPC LIDAR transceiver 401 receives returned light 470-1a-d1 corresponding to TE polarization via a respective input of the set of inputs 479c of the MIMO waveguide 477, and sends the returned light 470-1a-d1 to coupler 448. The DPC LIDAR transceiver 401 receives returned light 470-1a-d2 corresponding to TM polarization via a respective input of the set of inputs 479c of the MIMO waveguide 477, and sends the returned light 470-1a-d2 to coupler 451.

The DPC LIDAR transceiver 401 provides emission of the light signal 461-1a into free space toward one or more objects and receives the returned light (polarized) that is reflected from an object. The DPC LIDAR transceiver 401 receives returned light 471-1a-d1 corresponding to TE polarization via a respective input of the set of inputs 479c of the MIMO waveguide 477, and sends the returned light 471-1a-d1 to coupler 450. The DPC LIDAR transceiver 401 receives returned light 471-1a-d2 corresponding to TM polarization via a respective input of the set of inputs 479c of the MIMO waveguide 477, and sends the returned light 471-1a-d2 to coupler 452.

The DPC LIDAR transceiver 401 provides emission of the light signal 460-1b into free space toward one or more objects and receives the returned light (polarized) that is reflected back from an object. The DPC LIDAR transceiver 401 receives returned light 470-1b-d1 corresponding to TE polarization via a respective input of the set of inputs 479c of the MIMO waveguide 477, and sends the returned light 470-1b-d1 to coupler 453. The DPC LIDAR transceiver 401 receives returned light 470-1b-d2 corresponding to TM polarization via a respective input of the set of inputs 479c of the MIMO waveguide 477, and sends the returned light 470-1b-d2 to coupler 455.

The DPC LIDAR transceiver 401 provides emission of the light signal 461-1b into free space toward one or more objects and receives the returned light (polarized) that is reflected from an object. The DPC LIDAR transceiver 401 receives returned light 471-1b-d1 corresponding to TE polarization via a respective input of the set of inputs 479c of the MIMO waveguide 477, and sends the returned light 471-1b-d1 to coupler 454. The DPC LIDAR transceiver 401 receives returned light 471-1b-d2 corresponding to TM polarization via a respective input of the set of inputs 479c of the MIMO waveguide 477, and sends the returned light 471-1b-d2 to coupler 456.

The DPC LIDAR transceiver 401 provides emission of the light signal 460-2a into free space toward one or more objects and receives the returned light (polarized) that is reflected back from an object. The DPC LIDAR transceiver 401 receives returned light 470-2a-d1 corresponding to TE polarization via a respective input of the set of inputs 479c of the MIMO waveguide 477, and sends the returned light 470-2a-d1 to coupler 457. The DPC LIDAR transceiver 401 receives returned light 470-2a-d2 corresponding to TM polarization via a respective input of the set of inputs 479c of the MIMO waveguide 477, and sends the returned light 470-2a-d2 to coupler 459.

The DPC LIDAR transceiver 401 provides emission of the light signal 461-2a into free space toward one or more objects and receives the returned light (polarized) that is reflected from an object. The DPC LIDAR transceiver 401 receives returned light 471-2a-d1 corresponding to TE polarization via a respective input of the set of inputs 479c of the MIMO waveguide 477, and sends the returned light 471-2a-d1 to coupler 458. The DPC LIDAR transceiver 401 receives returned light 471-2a-d2 corresponding to TM polarization via a respective input of the set of inputs 479c of the MIMO waveguide 477, and sends the returned light 471-2a-d2 to coupler 464.

The DPC LIDAR transceiver 401 provides emission of the light signal 460-2b into free space toward one or more objects and receives the returned light (polarized) that is reflected back from an object. The DPC LIDAR transceiver 401 receives returned light 470-2b-d1 corresponding to TE polarization via a respective input of the set of inputs 479c of the MIMO waveguide 477, and sends the returned light 470-2b-d1 to coupler 465. The DPC LIDAR transceiver 401 receives returned light 470-2b-d2 corresponding to TM polarization via a respective input of the set of inputs 479c of the MIMO waveguide 477, and sends the returned light 470-2b-d2 to coupler 467.

The DPC LIDAR transceiver 401 provides emission of the light signal 461-2b into free space toward one or more objects and receives the returned light (polarized) that is reflected from an object. The DPC LIDAR transceiver 401 receives returned light 471-2b-d1 corresponding to TE polarization via a respective input of the set of inputs 479c of the MIMO waveguide 477, and sends the returned light 471-2b-d1 to coupler 466. The DPC LIDAR transceiver 401 receives returned light 471-2b-d2 corresponding to TM polarization via a respective input of the set of inputs 479c of the MIMO waveguide 477, and sends the returned light 471-2b-d2 to coupler 449.

In some implementations, the DPC LIDAR transceiver 401 may provide emission of one or more of the light signals into a Faraday circulator, and/or receive one or more returned lights (including their respective TE and TM polarizations) via the Faraday circulator. By using a Faraday circulator, the DPC LIDAR transceiver 401 can collect up to 3 dB more light and/or additional speckle realization, thereby resulting an increase in in probability of detection (PoD).

The coupler 448 is configured to associate the emitted light signal 460-1a with the returned light 470-1a-d1 by combining (e.g., joining, adding, coupling, linking) the LO signal 484-1a-1 with the returned light 470-1a-d1 to generate light signal 448s, and sending the light signal 448s to detectors 488a, 488b.

The coupler 449 is configured to associate the emitted light signal 461-2b with the returned light 471-2b-d2 by combining the LO signal 482-1a-1 with the returned light 471-2b-d2 to generate light signal 449s, and sending the light signal 449s to detectors 488a, 488b.

The coupler 450 is configured to associate the emitted light signal 461-1a with the returned light 471-1a-d1 by combining (e.g., joining, adding, coupling) the LO signal 486-1a-1 with the returned light 471-1a-d1 to generate light signal 450s, and sending the light signal 450s to detectors 489a, 489b.

The coupler 451 is configured to associate the emitted light signal 460-1a with the returned light 470-1a-d2 by combining the LO signal 480-1a-1 with the returned light 470-1a-d2 to generate light signal 451s, and sending the light signal 451s to detectors 489a, 489b.

The coupler 452 is configured to associate the emitted light signal 461-1a with the returned light 471-1a-d2 by combining the LO signal 482-1a-2 with the returned light 471-1a-d2 to generate light signal 452s, and sending the light signal 452s to detectors 490a, 490b.

The coupler 453 is configured to associate the emitted light signal 460-1b with the returned light 470-1b-d1 by combining the LO signal 484-1a-2 with the returned light 470-1b-d1 to generate light signal 453s, and sending the light signal 453s to detectors 490a, 490b.

The coupler 454 is configured to associate the emitted light signal 461-1b with the returned light 471-1b-d1 by combining the LO signal 486-1a-2 with the returned light 471-1b-d1 to generate light signal 454s, and sending the light signal 454s to detectors 491a, 491b.

The coupler 455 is configured to associate the emitted light signal 460-1b with the returned light 470-1b-d2 by combining the LO signal 480-1a-2 with the returned light 470-1b-d2 to generate light signal 455s, and sending the light signal 455s to detectors 491a, 491b.

The coupler 456 is configured to associate the emitted light signal 461-1b with the returned light 471-1b-d2 by combining the LO signal 482-1b-1 with the returned light 471-1b-d2 to generate light signal 456s, and sending the light signal 456s to detectors 492a, 492b.

The coupler 457 is configured to associate the emitted light signal 460-2a with the returned light 470-2a-d1 by combining the LO signal 484-1b-1 with the returned light 470-2a-d1 to generate light signal 457s, and sending the light signal 457s to detectors 492a, 492b.

The coupler 458 is configured to associate the emitted light signal 461-2a with the returned light 471-2a-d1 by combining the LO signal 486-1b-1 with the returned light 471-2a-d1 to generate light signal 458s, and sending the light signal 458s to detectors 493a, 493b.

The coupler 459 is configured to associate the emitted light signal 460-2a with the returned light 470-2a-d2 by combining the LO signal 480-1b-1 with the returned light 470-2a-d2 to generate light signal 459s, and sending the light signal 459s to detectors 493a, 493b.

The coupler 464 is configured to associate the emitted light signal 461-2a with the returned light 471-2a-d2 by combining the LO signal 482-1b-2 with the returned light 471-2a-d2 to generate light signal 464s, and sending the light signal 464s to detectors 494a, 494b.

The coupler 465 is configured to associate the emitted light signal 460-2b with the returned light 470-2b-d1 by combining the LO signal 484-1b-2 with the returned light 470-2b-d1 to generate light signal 465s, and sending the light signal 465s to detectors 494a, 494b.

The coupler 466 is configured to associate the emitted light signal 461-2b with the returned light 471-2b-d1 by combining the LO signal 486-1b-2 with the returned light 471-2b-d1 to generate light signal 466s, and sending the light signal 466s to detectors 495a, 495b.

The coupler 467 is configured to associate the emitted light signal 460-2b with the returned light 470-2b-d2 by combining the LO signal 480-1b-2 with the returned light 470-2b-d2 to generate light signal 467s, and sending the light signal 467s to detectors 495a, 495b.

The detector 488a is configured to generate an electrical signal based on the light signals 448s, 449s received and/or detected at its input. The detector 488b is configured to generate an electrical signal based on the light signals 448s, 449s received and/or detected at its input. The TIA 462 is configured to generate electrical signal 462s by amplifying one or more of the electrical signals that are received from detectors 488a, 488b, and send the electrical signal 462s to a first input of the multiplexer 473.

The detector 489a is configured to generate an electrical signal based on the light signals 450s, 451s received and/or detected at its input. The detector 489b is configured to generate an electrical signal based on the light signals 450s, 451s received and/or detected at its input. The TIA 463 is configured to generate an electrical signal 463s by amplifying one or more of the electrical signals that are received from detectors 489a, 489b, and send the electrical signal 463s to a second input of the multiplexer 473.

The detector 490a is configured to generate an electrical signal based on the light signals 452s, 453s received and/or detected at its input. The detector 490b is configured to generate an electrical signal based on the light signals 452s, 453s received and/or detected at its input. The TIA 464 is configured to generate an electrical signal 464s by amplifying one or more of the electrical signals that are received from detectors 490a, 490b, and send the electrical signal 464s to a first input of the multiplexer 474.

The detector 491a is configured to generate an electrical signal based on the light signals 454s, 455s received and/or detected at its input. The detector 491b is configured to generate an electrical signal based on the light signals 454s, 455s received and/or detected at its input. The TIA 465 is configured to generate an electrical signal 465s by amplifying one or more of the electrical signals that are received from detectors 491a, 491b, and send the electrical signal 465s to a second input of the multiplexer 474.

The detector 492a is configured to generate an electrical signal based on the light signals 456s, 457s received and/or detected at its input. The detector 492b is configured to generate an electrical signal based on the light signals 456s, 457s received and/or detected at its input. The TIA 466 is configured to generate an electrical signal 466s by amplifying one or more of the electrical signals that are received from detectors 492a, 492b, and send the electrical signal 466s to a first input of the multiplexer 475.

The detector 493a is configured to generate an electrical signal based on the light signals 458s, 459s received and/or detected at its input. The detector 493b is configured to generate an electrical signal based on the light signals 458s, 459s received and/or detected at its input. The TIA 467 is configured to generate an electrical signal 467s by amplifying one or more of the electrical signals that are received from detectors 493a, 493b, and send the electrical signal 467s to a second input of the multiplexer 475.

The detector 494a is configured to generate an electrical signal based on the light signals 464s, 465s received and/or detected at its input. The detector 494b is configured to generate an electrical signal based on the light signals 464s, 465s received and/or detected at its input. The TIA 468 is configured to generate an electrical signal 468s by amplifying one or more of the electrical signals that are received from detectors 494a, 494b, and send the electrical signal 468s to a first input of the multiplexer 476.

The detector 495a is configured to generate an electrical signal based on the light signals 466s, 467s received and/or detected at its input. The detector 495b is configured to generate an electrical signal based on the light signals 466s, 467s received and/or detected at its input. The TIA 469 is configured to generate an electrical signal 469s by amplifying one or more of the electrical signals that are received from detectors 495a, 495b, and send the electrical signal 469s to a second input of the multiplexer 476.

The output of the multiplexers 473, 474, 475, 476 are coupled to one or more analog-to-digital converters (ADC), which are configured to convert the electrical signals from analog signals to digital signals and provide the converted signals to a LIDAR system (e.g., vehicle control system 120, processor 122 in FIG. 1A and/or one or more processors of vehicle 100 in FIG. 1A) for determining range, velocity, and/or movement direction of one or more objects.

The LIDAR system, in some implementations, may configure the DPC LIDAR transceiver 401 and the multiplexers 473-476 to operate in a time-division multiplexing (TDM) mode (optical and/or electrical), such that a first group of I/O channels of the DPC LIDAR transceiver 401 operate (e.g., allows transmission of optical signals) during a first time slot (e.g., "TS-1"), and a second group of I/O channels of the DPC LIDAR transceiver 401 operate during a second time slot (e.g., TS-2). For example, the LIDAR system may operate the I/O channels of the DPC LIDAR transceiver 401 corresponding to "Group A" by providing a light signal to Tx-A 460, an LO signal to LO input 480, and an LO signal to LO input 484 during a first time slot (e.g., "TS-1"), which in turn, causes (1) the electrical signals 462s, 464s, 466s, 468s (the TE polarization signals) that are associated with the "Group A" signals to appear on the first inputs of multiplexers 473, 474, 475, 476; respectively; and (2) causes the electrical signals 463s, 465s, 467s, 469s (the TE polarization signals) that are also associated with the "Group A" signals to appear on the second inputs of multiplexers 473, 474, 475, 476; respectively.

During a first portion (referred to herein as, "TS-1a") of TS-1, the LIDAR system may send a control signal (e.g., a pulse, HIGH, LOW, etc.) to the control lines of the multiplexers 473, 474, 475, 476 to cause the multiplexers to select and send the electrical signals on its first input terminal to the ADCs. During a second portion (referred to herein as, "TS-1b") of TS-1, the LIDAR system may send a control signal to the control lines of the multiplexers 473, 474, 475, 476 to cause the multiplexers to select and send the electrical signals on its second input terminal to the ADCs.

As another example, the LIDAR system may operate the I/O channels of the DPC LIDAR transceiver 401 corresponding to "Group B" by providing a light signal to Tx-B 461, an LO signal to LO input 482, and an LO signal to LO input 486 during a second time slot (e.g., "TS-2"), which in turn, causes (1) the electrical signals 462s, 464s, 466s, 468s (the TE polarization signals) that are associated with the "Group B" signals to appear on the first inputs of multiplexers 473, 474, 475, 476; respectively; and (2) causes the electrical signals 463s, 465s, 467s, 469s (the TE polarization signals) that are also associated with the "Group B" signals to appear on the second inputs of multiplexers 473, 474, 475, 476; respectively.

During a first portion (referred to herein as, "TS-2a") of TS-2, the LIDAR system may send a control signal to the control lines of the multiplexers 473, 474, 475, 476 to cause the multiplexers to select and send the electrical signals on its first input terminal to the ADCs. During a second portion (referred to herein as, "TS-2b") of TS-2, the LIDAR system may send a control signal to the control lines of the multiplexers 473, 474, 475, 476 to cause the multiplexers to select and send the electrical signals on its second input terminal to the ADC.

In some implementations, the detectors 488-495, the TIAs 462-469, the ADCs, and/or the multiplexers 473-476 may be included in the TDM 405.

In some implementations, there are no signals (other than possible leakage signals that are <30 dB) traveling along the optical and/or electrical paths that are associated with the second group of I/O channels when then the first group of I/O channels are operated and/or enabled during the first time slot (e.g., TS-1). In some implementations, there are no signals (other than possible leakage signals that are <30 dB) traveling along the optical and/or electrical paths that are associated with the first of I/O channels when then the second group of I/O channels are operated and/or enabled during the second time slot (e.g., TS-2).

As shown in FIG. 4, the MIMO waveguide 477 is a multi-mode waveguide because it receives and/or transmits the light signals that are associated with the Group 'A' inputs (e.g., Tx input 460, LO input 480, and LO input 484) and the Group 'B' inputs (e.g., Tx input 461, LO input 482, and LO input 486). In some implementations, separate waveguides may be used instead of a multi-mode waveguide. For example, a first waveguide may configured to receive and/or transmit the light signals that are associated with the Group 'A' inputs and a second waveguide may configured to receive and/or transmit the light signals that are associated with the Group 'B' inputs.

Although the environment 400 of FIG. 4 shows only a select number of circuits and/or components (splitters, couplers, MIMO waveguides, detectors, TIAs, multiplexers, fiber arrays), the environment 400 may include any number of components (and mirrored circuits) that are interconnected in any arrangement for receiving/transmitting any number of light signals to facilitate the operation of a vehicle. In some implementations, each channel may have a transmit waveguide Tx_n and two receive waveguides Rx_n_p that are on either side of the Tx_n waveguide that collect opposite polarizations. In some implementations, each Rx_n_p may be mixed in a coupler (e.g., coupler 68, coupler, 449, . . . , etc.) against an LO signal of the corresponding and/or proper polarization, and detected with a balance photodetector (PD) pair (e.g., detector 488*a* and detector 488*b*; detector 489*a* and detector 489*b*, . . . , etc.) for a total of 8 balanced photodiodes.

Figure 5:
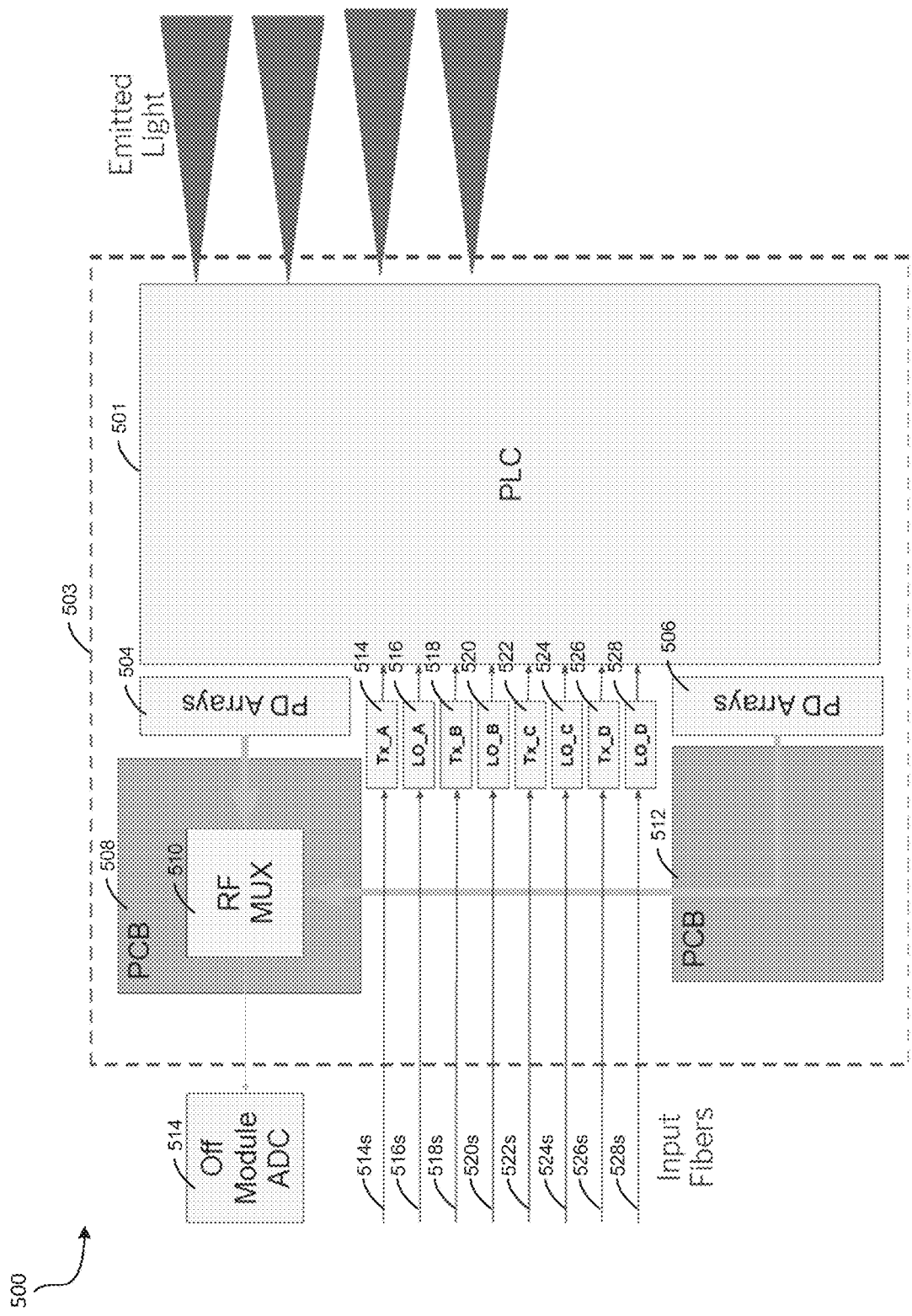
FIG. 5 is a block diagram illustrating an example environment of a dual polarization coherent LIDAR system for operating a vehicle, according to some implementations.

FIG. 5 is a block diagram illustrating an example environment of a dual polarization coherent LIDAR system for operating a vehicle, according to some implementations. The environment 500 includes a dual polarization coherent (DPC) LIDAR module 503, a network of ADCs 514, and input fibers 514*s*, 516*s*, 518*s*, 520*s*, 522*s*, 524*s*, 526*s*, 528*s* (collectively referred to as, "input fibers 514*s*-528*s*"). In some implementations, a semiconductor substrate and/or semiconductor package may include the DPC LIDAR module 503.

The DPC LIDAR module 503 includes a programmable logic controller (PLC) 501 that is programmed and/or configured to include the same (or similar) components and/or functionality as a DPC LIDAR transceiver (e.g., DPC LIDAR transceiver 401 in FIG. 4). The PLC 501 includes a plurality of input channels that are coupled to the input fibers 514-528*s*.

The plurality of input channels are arranged in the following order: Tx_A 514, LO_A 516, Tx_B 518, LO_B 520, Tx_C 522, LO_C 524, Tx_D 526, and LO_D 528. As shown in FIG. 5, a Tx input channel (e.g., Tx_A 514) is adjacent to an LO input channel (e.g., LO_A 516), but is not adjacent to another Tx input channel (e.g., Tx_B 518). By separating (isolating) Tx input channels from other Tx input channels, the configuration of the PLC 501 can prevent (or mitigate) the scattering of light from one Tx input channel onto another Tx input channel.

Likewise, an LO input channel (e.g., LO_A 516) is adjacent to a Tx input channel (e.g., Tx_A 514), but is not adjacent to another LO input channel (e.g., LO_B 520). By separating (isolating) LO input channels from other LO input channels, the configuration of the PLC 501 can prevent (or mitigate) the scattering of light from one LO input channel onto another LO input channel.

The DPC LIDAR module 503 includes a printed circuit board (PCB) 512 and a PCB 508. The PCB 508 includes a network of multiplexers 510 (shown in FIG. 5 as, "RF MUX 510").

The DPC LIDAR module 503 includes a detector array 504 and detector array 506, each including a plurality of detectors (e.g., detectors 488*a*, 488*b*, 489*a*, 489*b*, . . . , etc.). The detector arrays 504 is configured to receive optical signals from the PLC 501, generate a first set of electrical signals corresponding to TM polarization signals, generate a second set of electrical signals corresponding to TE polarization, send the first set of electrical signals to first inputs of the multiplexers 510 via the PCB 508, and send the second set of electrical signals to second inputs of the multiplexers 510 via the PCB 508.

The detector array 512 is configured to receive optical signals from the PLC 501, generate a first set of electrical signals corresponding to TM polarization signals, generate a second set of electrical signals corresponding to TE polarization, send the first set of electrical signals to first inputs of the multiplexers 510 via the PCB 512, and send the second set of electrical signals to second inputs of the multiplexers 510 via the PCB 512.

A LIDAR system (e.g., vehicle control system 120, processor 122 in FIG. 1A and/or one or more processors of vehicle 100 in FIG. 1A) is configured to toggle the control lines of the multiplexers 510 according to a plurality of time slots (e.g., TS-1, TS-1a, TS-1b, TS-2, TS-2a, TS-2b, . . . , etc.), to cause the multiplexers 510 to send the one or more sets of electrical signals to the ADCs 514.

Figure 6:
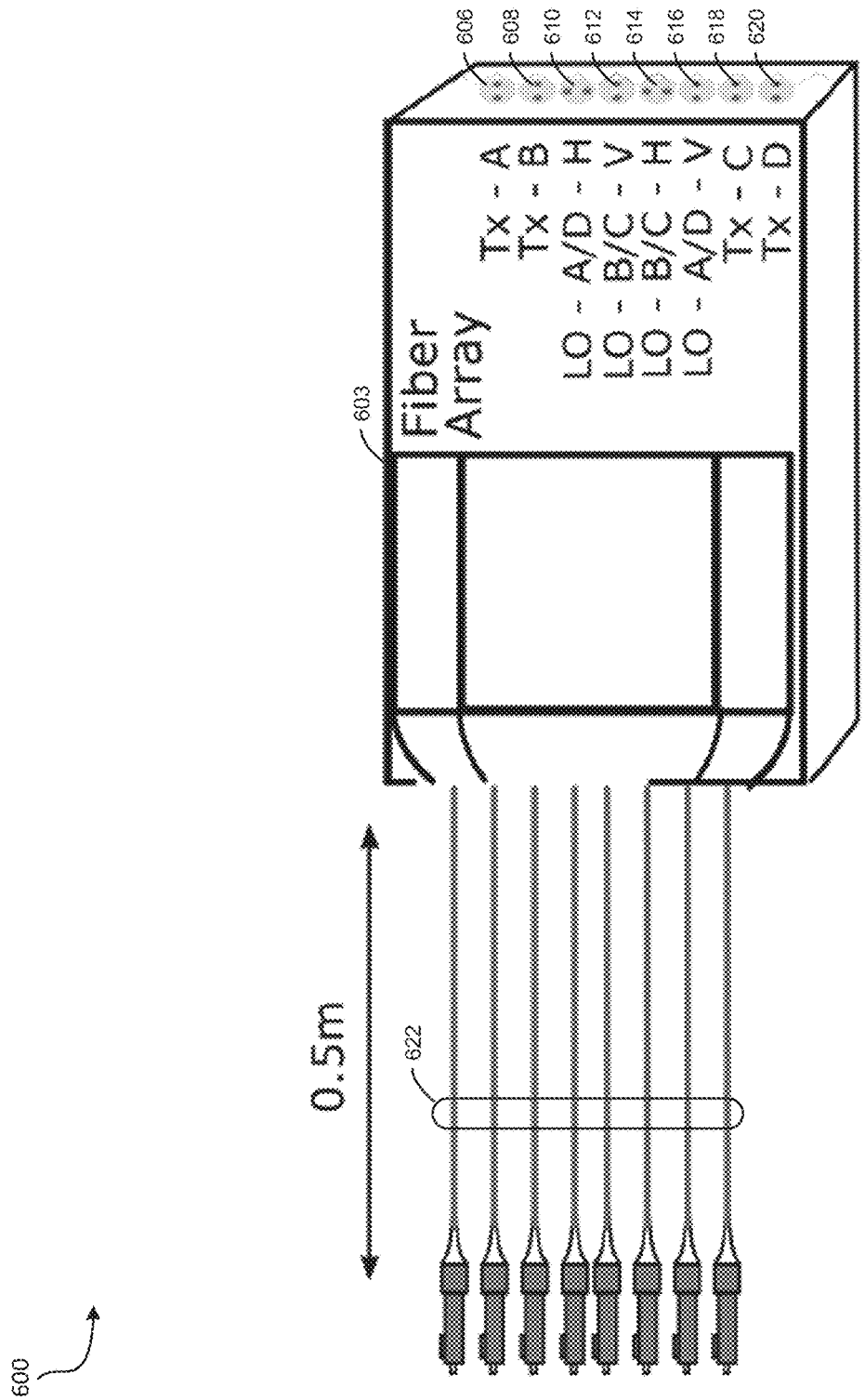
FIG. 6 is a block diagram illustrating an example environment of a fiber array for providing light signals to a multi-channel dual polarization coherent (DPC) LIDAR system, according to some implementations.

FIG. 6 is a block diagram illustrating an example environment of a fiber array for providing light signals to a DPC LIDAR system, according to some implementations. The environment includes fiber coupling 622 (e.g., a collection of fiber cables) and a fiber array 603. The fiber coupling receives light signals from a laser source (e.g., laser source 202 in FIG. 2) and provides the light signals to the fiber array. As shown, the fiber coupling 622 may have a length up to 0.5 meters.

The fiber array 603 includes a plurality of output channels that are arranged in the following order: Tx-A 606, Tx-B 608, LO-A/D-H 610, LO-B/C-V 612, LO-B/C-V 614, LO-A/D-V 616, Tx-C 618, and Tx-D 620. Each output channel is respectively mapped to an internal path (not shown in FIG. 6) of the fiber array 603, which are each mapped to a respective fiber cable of the fiber coupling 622.

In some implementations, the fiber array coupling into a PLC (e.g., PLC 501 in FIG. 5) may have polarization orientations that correspond to the polarization orientation of the environment 600. In some implementations, the LO may be polarized in the plane that is parallel to a PLC or a semiconductor substrate. In some implementations, the Tx may be polarized in the plane that is perpendicular to a PLC or a semiconductor substrate.

Figure 7:
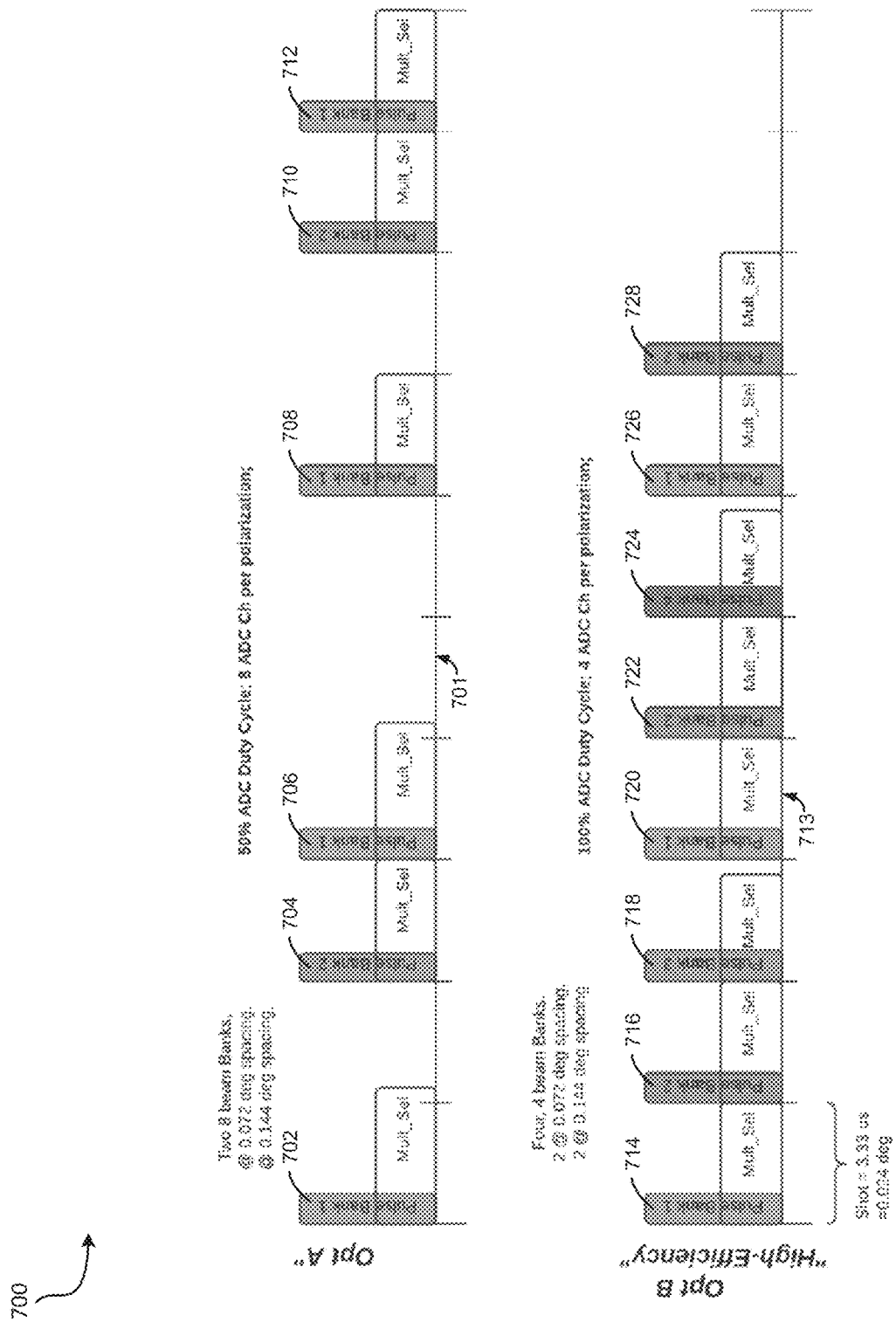
FIG. 7 is a graph illustrating example timelines for operating a LIDAR system in a time-division multiplexing mode, according to some implementations.

FIG. 7 is a graph illustrating example timelines for operating a LIDAR system in a time-division multiplexing mode, according to some implementations. The environment includes a timeline 701 showing example spacing (e.g., time intervals, time slots) of the optical signals that are provided from a laser source to each of the two groups (sometimes referred to as, "banks") of input channels of an 8-channel DPC LIDAR transceiver (e.g., LIDAR transceiver 401 in FIG. 4). The LIDAR system causes (e.g., controls) the laser source to drive the Group 'A' inputs (e.g., Tx input 460, LO input 480, and LO input 484) with pulse 702 during a first time slot (TS-1), pulse 706 during a third time slot (TS-3), pulse 708 during a fourth time slot (TS-4), and pulse 712 during a sixth time slot (TS-6).

The LIDAR system causes the laser source to drive the Group 13' inputs (e.g., Tx input 461, LO input 482, and LO input 486) with pulse 704 during a second time slot (TS-2) and pulse 710 during a fifth time slot (TS-5). The chronological ordering of the timeslots on timeline 701 may be as follows: TS-1, TS-2, TS-3, TS-4, TS-5, and TS-6. In some implementations, the spacing between pulses (e.g., optical signals) may be 0.072 degrees or 0.144 degrees. In some implementations, the LIDAR system may operate the ADCs with a duty cycle in an inclusive range of 45% to 55% (45%≤duty cycle≤55%). In some implementations, the LIDAR system may operate the ADCs with a duty cycle in an inclusive range of 33% to 100% (33%≤duty cycle≤100%). For example, a "high density" timing diagram actually achieves nearly 100%, as the system digitizes electrical signals for longer than the pulse. In some implementations, the LIDAR system may include 8 ADCs per polarization. Although the timeline 701 shows that the spacing between the pulses may be 0.072 degrees or 0.144 degrees when operating the ADCs at a 50% duty cycle, in some implementations, the LIDAR system may be configured to receive (and process) pulses that have spacings that are less than 0.072 degrees, greater than 0.144 degrees, or within an inclusive range of 0.072 degrees and 0.144 degrees (0.072 degrees≤spacing≤0.144 degrees). In some implementations, pulses may have a spacing that is within an inclusive range of 0.05 degrees and 0.2 degrees.

The environment includes a timeline 713 showing the example spacing of the optical signals that are provided from a laser source to each of the four groups of input channels of a 4-channel DPC LIDAR transceiver. The LIDAR system causes the laser source to drive a first group of inputs (Tx inputs and/or LO inputs) with pulse 714 during a first time slot (TS-1), pulse 720 during a fourth time slot (TS-4), and pulse 726 during a seventh time slot (TS-7). The LIDAR system causes the laser source to drive a second group of inputs with pulse 716 during a second time slot (TS-2), pulse 722 during a fifth time slot (TS-5), and pulse 728 during an eight time slot (TS-8). The LIDAR system causes the laser source to drive a third group of inputs with pulse 718 during a third time slot (TS-3) and a fourth group of inputs with a pulse 724 during a sixth time slot (TS-6).

The chronological ordering of the timeslots on timeline 713 may be as follows: TS-1, TS-2, TS-3, TS-4, TS-5, TS-6, TS-7, and TS-8. In some implementations, the spacing between pulses may be 0.072 degrees or 0.144 degrees. In some implementations, the LIDAR system may operate the ADCs with a duty cycle in an inclusive range of 95% to 100%. In some implementations, the LIDAR system may include 4 ADCs per polarization. In some implementations, a slot corresponding to a pulse may be 3.33 microseconds (0.024 degrees+/−0.04 degrees, or 0.020 degrees to 0.028 degrees). In some implementations, a slot corresponding to a pulse (e.g., a spacing between a first optical beam provided at a first time slot and a second optical beam provided at the next time slot) can be in an inclusive range of 0.012 degrees to 0.096 degrees, since time slot spacing larger than this range makes time-multiplexing of limited use. In some implementations, a minimum spacing may be 0.04 degrees. Although the timeline 713 shows that the spacing between the pulses may be 0.072 degrees or 0.144 degrees when operating the ADCs at a 100% duty cycle, in some implementations, the LIDAR system may be configured to receive (and process) pulses that have spacings that are less than 0.072 degrees, greater than 0.144 degrees, or within an inclusive range of 0.072 degrees and 0.144 degrees.

During each of the time slots in timeline 701 and timeline 713, the LIDAR system may control (e.g., sends control signals, toggles) the control lines of the multiplexers 473-476 of the TDM circuit 405 to cause the multiplexers to send the electrical signals (these electrical signals correspond to the light that was returned to the LIDAR transceiver responsive to a transmission of light into free-space during a time slot) on their respective input terminal to the ADCs. In some implementations, operating a LIDAR system and/or a DPC LIDAR transceiver according to timeline 713 is more efficient than operating the LIDAR system and/or a DPC LIDAR transceiver according to timeline 701.

Figure 8:
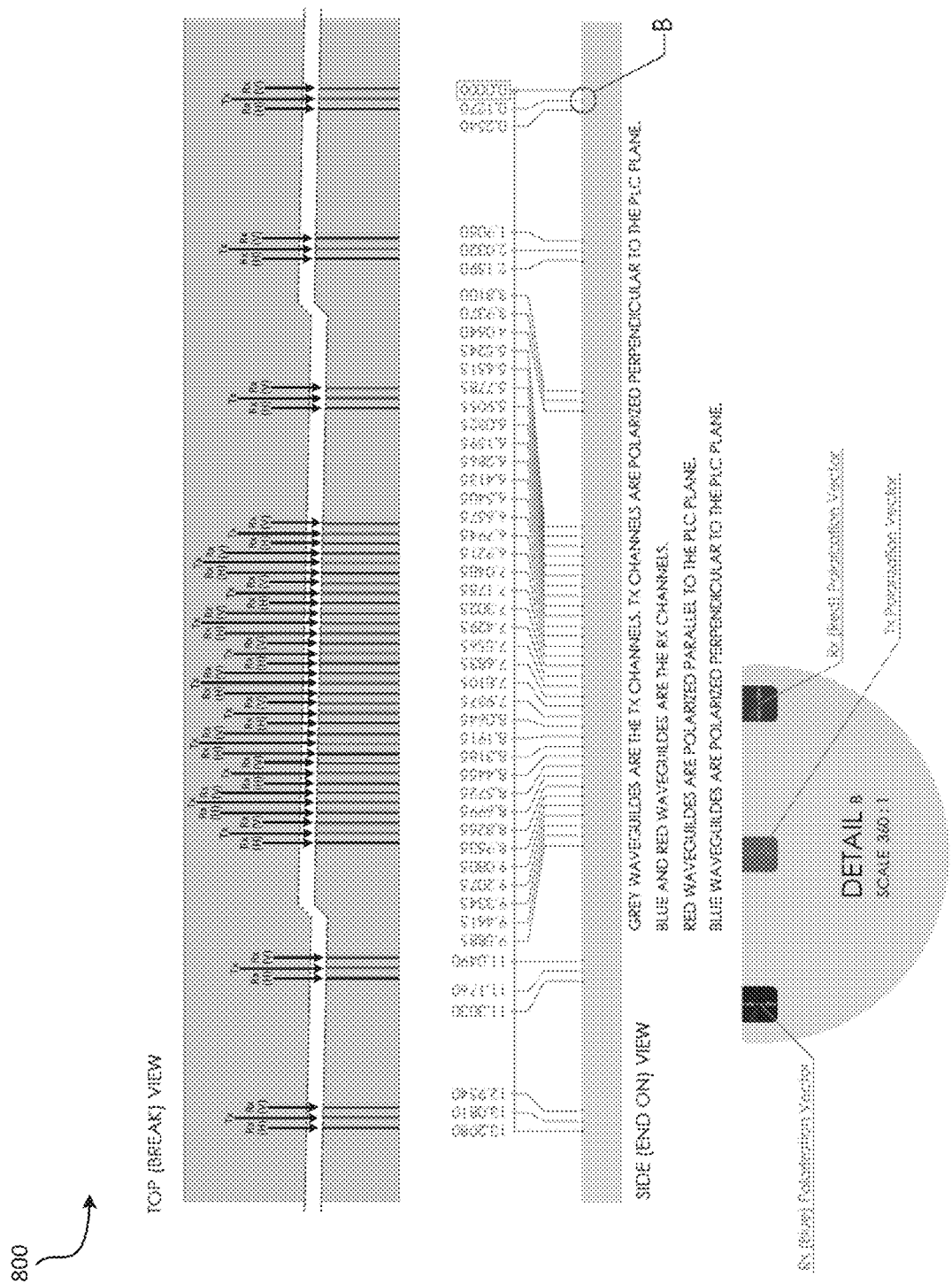
FIG. 8 is a block diagram illustrating an example layout of I/O channels of a PLC, according to some implementations.

FIG. 8 is a block diagram illustrating an example layout of I/O channels of a PLC, according to some implementations. The layout 800 shows the arrangement and spacing for the input channels (shown as, "RX (H)") into the waveguides of the PLC (e.g., DPC LIDAR transceiver 401 in FIG. 4) that are configured to receive the returned light corresponding to TM polarization. The waveguides coupled to the RX (H) channels are polarized perpendicular to the PLC plane.

The layout 800 shows the arrangement and spacing for the input channels (shown as, "RX (V)") into the waveguides of the PLC that are configured to receive the returned light corresponding to TE polarization. The waveguides coupled to the RX (V) channels are polarized parallel to the PLC plane.

The layout 800 shows the arrangement and spacing for the transmit output channels (shown as, "TX") out of the PLC that are configured to transmit light beams into free-space. The transmit output channels are polarized perpendicular to the PLC plane.

Figure 9:
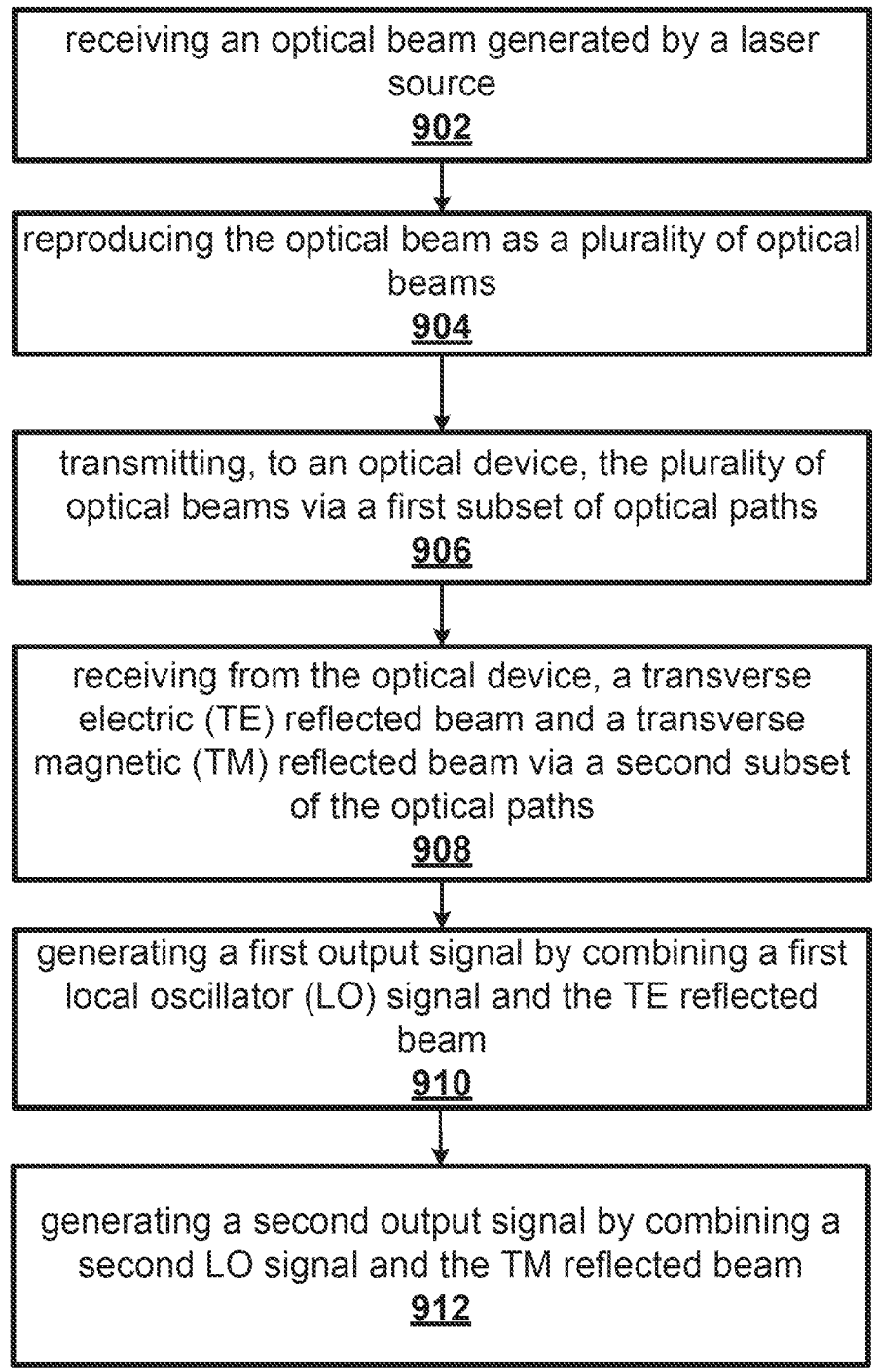
FIG. 9 is a flow chart that illustrates an example method for combining multiple functions of a LIDAR system, according to an implementation.

FIG. 9 is a flow chart that illustrates an example method for combining multiple functions of a LIDAR system, according to an implementation. Although steps are depicted in FIG. 9 as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, some or all operations of method 900 may be performed by the DPC LIDAR transceiver 401 in FIG. 4.

The method 900 includes the operation 902 of receiving an optical beam generated by a laser source. In some implementations, the optical beam is associated with a local oscillator (LO) signal. The method 900 includes the operation 904 of reproducing the optical beam as a plurality of optical beams. The method 900 includes the operation 906 of transmitting, to an optical device, the plurality of optical beams via a first subset of optical paths. The method 900 includes the operation 908 of receiving from the optical device, a transverse electric (TE) reflected beam and a transverse magnetic (TM) reflected beam via a second subset of the optical paths. The method 900 includes the operation 910 of associating a first local oscillator (LO) signal with the TE reflected beam to generate a first associated signal. The method 900 includes the operation 912 of associating a first local oscillator (LO) signal with the TE reflected beam to generate a first associated signal.

FIG. 10 is a flow chart that illustrates an example method for combining multiple functions of a LIDAR system, according to an implementation. Although steps are depicted in FIG. 10 as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, some or all operations of method 1000 may be performed by the DPC LIDAR transceiver 401 in FIG. 4.

The method 1000 includes the operation 1002 of controlling, by one or more processors (e.g., LIDAR system, vehicle control system 120, processor 122 in FIG. 1A and/or one or more processors of vehicle 100 in FIG. 1A), a laser to provide an optical beam to a first input optical channel of a transceiver during a first time slot. The method includes the operation 1004 of generating, by the transceiver responsive to receiving the optical beam, a transverse electric (TE) reflected beam and a transverse magnetic (TM) reflected beam. The method includes the operation 1006 of sending, by the transceiver, the TE reflected beam and the TM reflected beam to a time-division multiplexing (TDM) circuit via a first output channel of the transceiver. The method includes the operation 1008 of generating, by the TDM circuit, a plurality of first signals (e.g., electrical signals) that are associated with the TM reflected beam and the TE reflected beam. The method includes the operation 1010 of controlling, by the one or more processors, the TDM circuit to select the plurality of first signals during the first time slot.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

Some implementations of the present disclosure are described below in the context of one or more hi-res Doppler LIDAR systems that are mounted onto an area (e.g., front, back, side, top, and/or bottom) of a personal automobile; but, implementations are not limited to this context. In other implementations, one or multiple systems of the same type or other high resolution LIDAR, with or without Doppler components, with overlapping or non-overlapping fields of view or one or more such systems mounted on smaller or larger land, sea or air vehicles, piloted or autonomous, are employed. In other implementations, the scanning hi-res LIDAR is mounted at temporary or permanent fixed positions on land or sea.

What is claimed:

1. A light detection and ranging (LIDAR) system for a vehicle, the LIDAR system comprising:
    a laser source configured to generate light signals;
    a transceiver; and
    a fiber array coupled to the transceiver and comprising a plurality of output channels,
    wherein the transceiver is configured to:
        receive one or more light signals from the laser source through a first group of output channels of the fiber array, the first group of output channels being associated with a first type of signal,
        receive one or more local oscillator (LO) signals from the laser source through a second group of output channels of the fiber array, the second group of output channels being associated with a second type of signal, different from the first type of signal,
        transmit the one or more light signals into an environment of the vehicle,
        receive a first returned light reflected from one or more objects in the environment, and
        output the first returned light and a first LO signal of the one or more LO signals.

2. The LIDAR system as recited in claim 1, wherein the first returned light and the first LO signal have the same polarization.

3. The LIDAR system as recited in claim 1, wherein the one or more LO signals are polarized in a particular angle with reference to a plane of the transceiver.

4. The LIDAR system as recited in claim 1, wherein the one or more LO signals are polarized parallel to the plane of the transceiver.

5. The LIDAR system as recited in claim 1, further comprising:
    a substrate on which the transceiver is disposed,
    wherein the one or more LO signals are polarized in a particular angle with reference to a plane of the semiconductor substrate.

6. The LIDAR system as recited in claim 1, wherein the first group of output channels include:
    a first transmit (TX) output channel through which at least one of the one or more light signals is received at a first time slot, and
    a second TX output channel through which at least one of the one or more light signals is received at a second time slot different from the first time slot.

7. The LIDAR system as recited in claim 6, wherein the second group of output channels include:
    a first output channel through which at least one of the one or more LO signals is received at the first time slot, and
    a second LO output channel through which at least one of the one or more LO signals is received at the second time slot.

8. The LIDAR system as recited in claim 7, wherein in the fiber array, the first TX output channel, the second TX output channel, the first LO output channel, and the second LO output channel are disposed in this order.

9. The LIDAR system as recited in claim 1, wherein the transceiver is further configured to:
    receive one or more LO signals through a third group of output channels of the fiber array;
    receive a second returned light reflected from the one or more objects in the environment; and
    output the second returned light and a second LO signal of the one or more LO signals received through the third group of output channels.

10. The LIDAR system as recited in claim 9, wherein the one or more LO signals received through the second group of output channels have a polarization different than a polarization of the one or more LO signals received through the third group of output channels.

11. The LIDAR system as recited in claim 9, wherein in the fiber array, the first group of output channels, the second group of output channels and the third group of output channels are disposed in this order.

12. The LIDAR system as recited in claim 1, wherein
    the transceiver comprises a first waveguide that is polarized in a first angle with reference to a plane of the transceiver, wherein the transceiver comprises a second waveguide that is polarized in a second angle with reference to the plane of the transceiver.

13. The LIDAR system as recited in claim 12, wherein the first waveguide is polarized parallel to the plane of the transceiver, wherein the second waveguide is polarized perpendicular to the plane of the transceiver.

14. A method, comprising:
generating light signals by a laser source;
receiving one or more light signals from the laser source through a first group of output channels of a fiber array, the first group of output channels being associated with a first type of signal;
receiving one or more local oscillator (LO) signals from the laser source through a second group of output channels of the fiber array, the second group of output channels being associated with a second type of signal, different from the first type of signal;
transmitting the one or more light signals into an environment of a vehicle;
receiving a first returned light reflected from one or more objects in the environment; and
outputting the first returned light and a first LO signal of the one or more LO signals.

15. The method as recited in claim 14, wherein the first returned light and the first LO signal have the same polarization.

16. The method as recited in claim 14, wherein
receiving the one or more light signals from the laser source through the first group of output channels comprises:
receiving at least one of the one or more light signals through a first transmit (TX) output channel of the first group of output channels at a first time slot; and
receiving at least one of the one or more light signals through a second TX output channel of the first group of output channels at a second time slot different from the first time slot, and
receiving the one or more LO signals through the second group of output channels comprises:
receiving at least one of the one or more LO signals through a first LO output channel of the second group of output channels at the first time slot, and
receiving at least one of the one or more LO signals through a second LO output channel of the second group of output channels at the second time slot.

17. The method as recited in claim 14, further comprising:
receiving one or more LO signals through a third group of output channels of the fiber array;
receiving a second returned light reflected from the one or more objects in the environment; and
outputting the second returned light and a second LO signal of the one or more LO signals received through the third group of output channels.

18. The method as recited in claim 17, wherein the second returned light and the second LO signal have the same polarization.

19. The method as recited in claim 17, wherein the one or more LO signals received through the second group of output channels have a polarization different than a polarization of the one or more LO signals received through the third group of output channels.

20. An autonomous vehicle, comprising:
a light detection and ranging (LIDAR) system, comprising:
a laser source configured to generate light signals;
a transceiver; and
a fiber array coupled to the transceiver and comprising a plurality of Output channels,
wherein the transceiver is configured to:
receive one or more light signals from the laser source through a first group of output channels of the fiber array, the first group of output channels being associated with a first type of signal,
receive one or more local oscillator (LO) signals from the laser source through a second group of output channels of the fiber array, the second group of output channels being associated with a second type of signal, different from the first type of signal,
transmit the one or more light signals into an environment of the vehicle,
receive a first returned light reflected from one or more objects in the environment, and
output the first returned light and a first LO signal of the one or more LO signals;
a steering system;
a braking system; and
a vehicle controller configured to control operation of at least one of the steering system or the braking system based on the one or more light signals, the first returned light, and the first LO signal.

21. The LIDAR system as recited in claim 1, wherein the first type of signal corresponds to a transmit light signal for being transmitted into the environment of the vehicle, and the second type of signal corresponds to a transverse magnetic light signal or a transverse electric light signal.

22. A light detection and ranging (LIDAR) system for a vehicle, the LIDAR comprising:
a laser source configured to generate light signals;
a transceiver; and
a fiber array coupled to the transceiver and comprising a plurality of output channels,
wherein the transceiver is configured to:
receive one or more light signals from the laser source through a first group of output channels of the fiber array,
receive one or more local oscillator (LO) signals through a second group of output channels of the fiber array,
receive one or more LO signals through a third group of output channels of the fiber array,
transmit the one or more light signals into an environment of the vehicle,
receive a first returned light reflected from one or more objects in the environment,
receive a second returned light reflected from the one or more objects in the environment,
output the first returned light and a first LO signal of the one or more LO signals, and
output the second returned light and a second LO signal of the one or more LO signals received through the third group of output channels.

23. A light detection and ranging (LIDAR) system for a vehicle, the LIDAR system comprising:
a laser source configured to generate light signals;
a transceiver comprising a first waveguide that is polarized in a first angle with reference to a plane of the transceiver and a second waveguide that is polarized in a second angle with reference to the plane of the transceiver; and
a fiber array coupled to the transceiver and comprising a plurality of output channels,
wherein the transceiver is configured to:
receive one or more light signals from the laser source through a first group of output channels of the fiber array,
receive one or more local oscillator (LO) signals through a second group of output channels of the fiber array, transmit the one or more light signals into an environment of the vehicle,
receive a first returned light reflected from one or more objects in the environment, and
output the first returned light and a first LO signal of the one or more LO signals.

* * * * *